United States Patent
Khazeni

(10) Patent No.: US 12,379,252 B2
(45) Date of Patent: Aug. 5, 2025

(54) MEMS DEVICE FOR INTERFEROMETRIC SPECTROSCOPY

(71) Applicant: Spectrove Inc., San Jose, CA (US)

(72) Inventor: Kasra Khazeni, San Jose, CA (US)

(73) Assignee: Spectrove Corporation, Danville, CA (US)

( * ) Notice: Subject to any disclaimer, the term of this patent is extended or adjusted under 35 U.S.C. 154(b) by 139 days.

(21) Appl. No.: 18/082,659

(22) Filed: Dec. 16, 2022

(65) Prior Publication Data

US 2023/0375408 A1 Nov. 23, 2023

Related U.S. Application Data

(63) Continuation of application No. 17/151,207, filed on Jan. 17, 2021, now Pat. No. 11,530,952.

(60) Provisional application No. 62/995,197, filed on Jan. 17, 2020.

(51) Int. Cl.
*G01J 3/453* (2006.01)
*G01J 3/02* (2006.01)

(52) U.S. Cl.
CPC ........... *G01J 3/4531* (2013.01); *G01J 3/0208* (2013.01)

(58) Field of Classification Search
CPC ...... G01J 3/4531; G01J 3/0208; G01J 3/0256; G01J 3/2803; G01J 3/26
See application file for complete search history.

(56) References Cited

U.S. PATENT DOCUMENTS

| | | | |
|---|---|---|---|
| 2015/0042362 A1* | 2/2015 | Shinto | G02B 26/001 359/578 |
| 2016/0054179 A1* | 2/2016 | Carr | G01J 3/26 356/454 |
| 2017/0146401 A1* | 5/2017 | Antila | G01J 3/45 |
| 2018/0052049 A1* | 2/2018 | Varpula | G01B 9/02018 |

OTHER PUBLICATIONS

Rissanen et al., Monolithically integrated microspectrometer-on-chip based on tunable visible light MEMS FPI, Sensors and Actuators A: Physical, vol. 182, 2012, pp. 130-135 (Year: 2012).*

* cited by examiner

*Primary Examiner* — Tarifur R Chowdhury
*Assistant Examiner* — Akbar H. Rizvi
(74) *Attorney, Agent, or Firm* — Pillsbury Winthrop Shaw Pittman LLP

(57) ABSTRACT

The present application relates to a system for performing time-resolved interferometric spectroscopy of incoming light. In some embodiments, the system includes one or more optical elements, a photo-detector, a capacitance detector, and one or more processors. Upon application of a varying input signal to the one or more optical elements, a change to an optical characteristic is caused resulting in a changing interference pattern produced by the incoming light incident on the one or more optical elements. During the application of the varying input signal, the photo-detector may detect an intensity of light output from the one or more optical elements and the capacitance detector may detect a capacitance of the one or more optical elements.

15 Claims, 15 Drawing Sheets

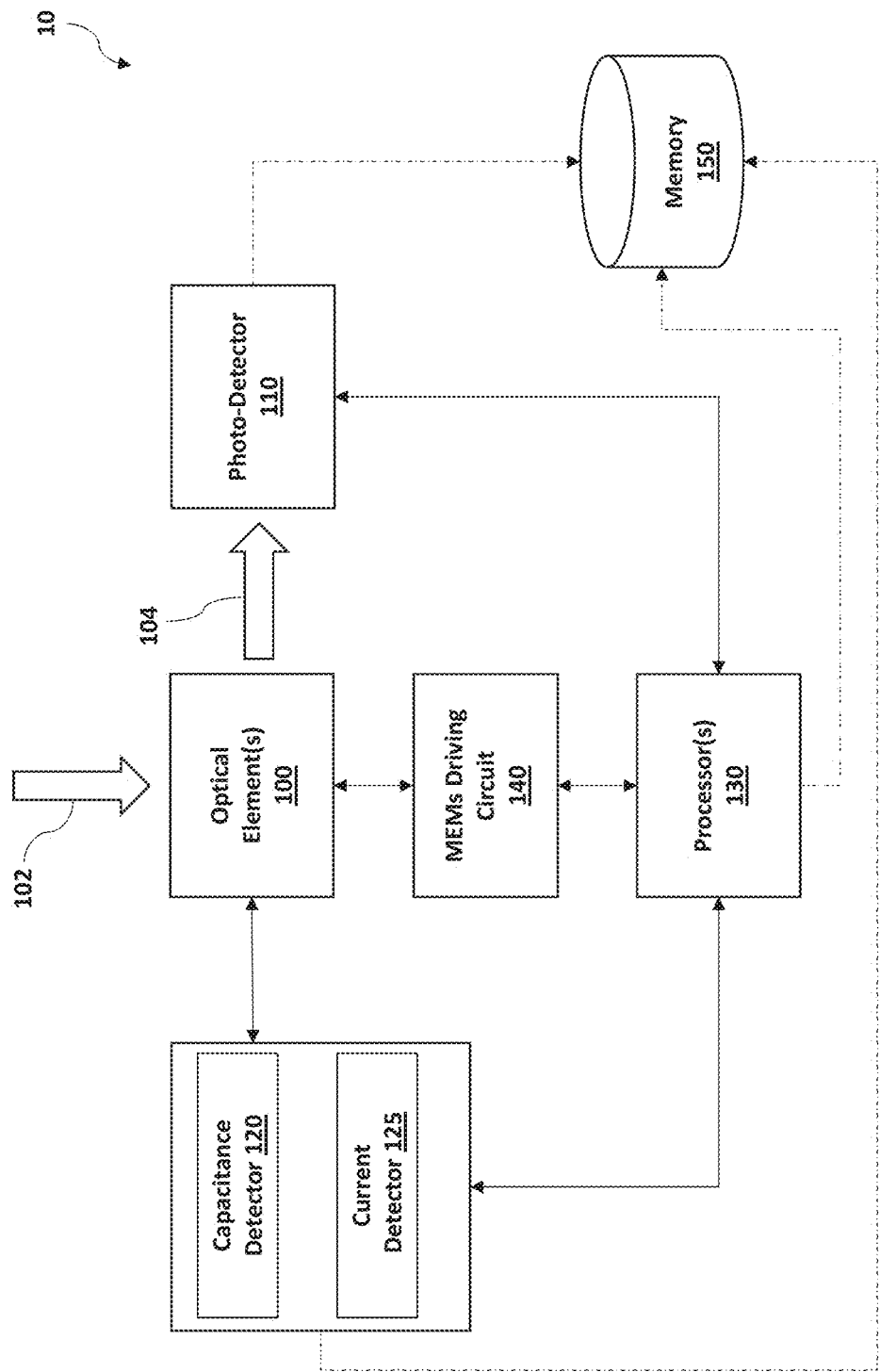

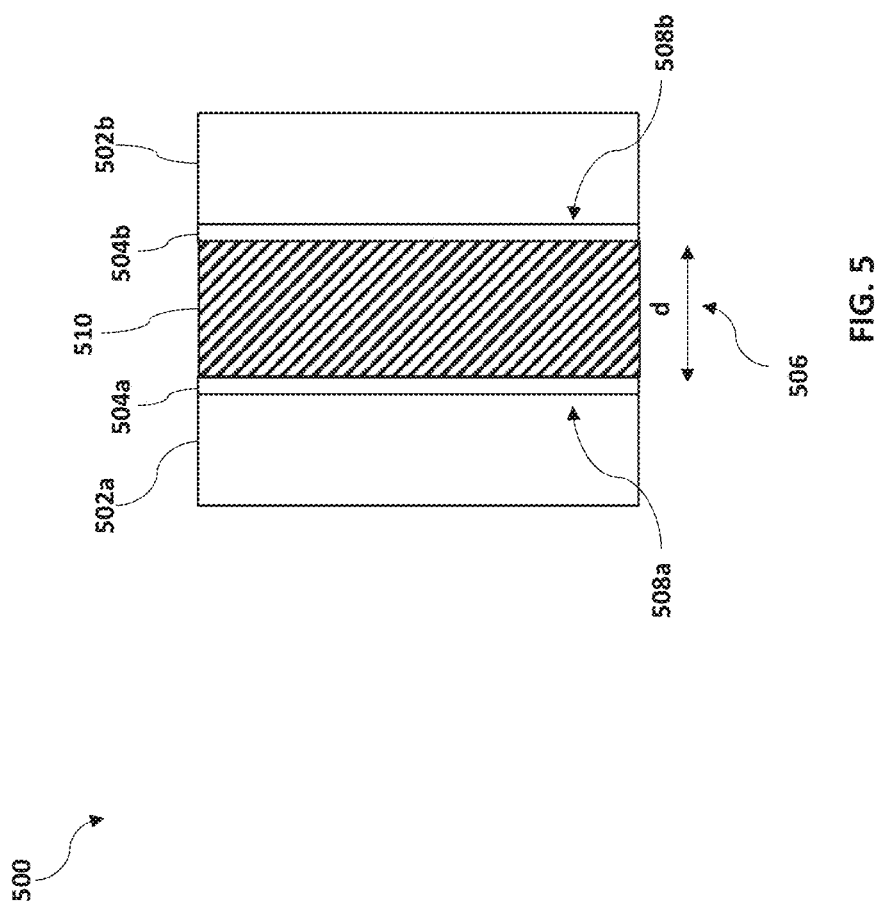

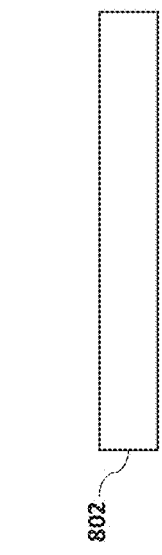
FIG. 8A
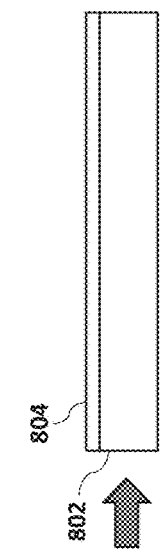
FIG. 8B
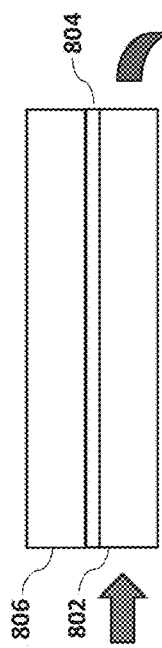
FIG. 8C
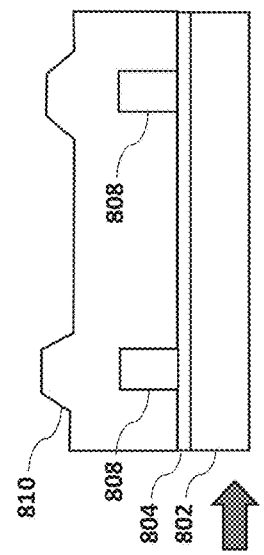
FIG. 8D
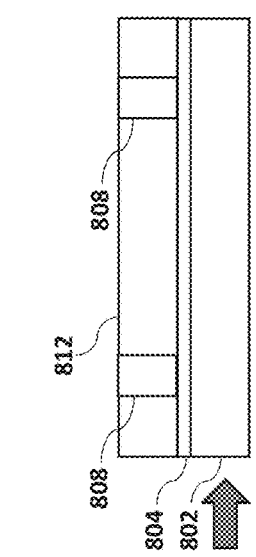
FIG. 8E
FIG. 8F
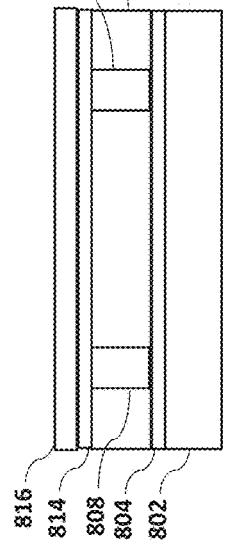
FIG. 8G
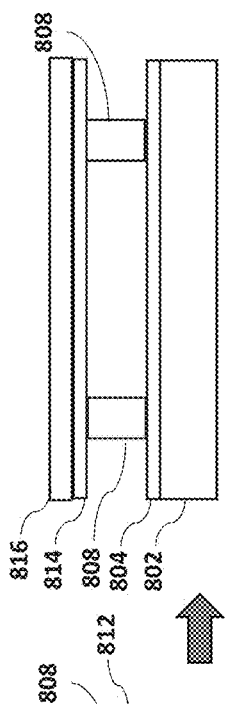
FIG. 8H

MEMS DEVICE FOR INTERFEROMETRIC SPECTROSCOPY

CROSS-REFERENCE TO RELATED APPLICATIONS

The present application is a continuation of U.S. patent application Ser. No. 17/151,207 filed Jan. 17, 2021, which claims the benefit of U.S. Provisional Patent Application Ser. No. 62/995,197, filed Jan. 17, 2020, the contents of which are hereby incorporated by reference in their entirety.

BACKGROUND

1. Field

The present disclosure relates generally to interferometric spectroscopy, and in particular, micro-electromechanical system (MEMS) devices capable of performing time-dependent interferometric spectroscopy.

2. Description of the Related Art

Spectroscopy is a technique whereby an intensity of incident light as a function of wavelength is measured. The measured spectrum of light can be used for a variety of functions, such as resolving a material composition of matter with which the incident light interacts. Interferometric devices, also referred to as "interferometers," are devices used to analyze the incident light. Interferometers harness the wave-like propriety of light to determine the wavelength(s) of the incident light. Constructive and destructive interference of light cause particular intensity patterns to be produced, and, using the intensity pattern, a wavelength of the incident light can be resolved.

One type of interferometer that is used is a Fabry-Perot Interferometer. The Fabry-Perot Interferometer includes two plates that are partially reflective and partially transmissive (e.g., two glass plates having a reflective coating on an inner surface), which are spaced apart from one another by a small air gap. Interference is created when the incident light passing through the plates interacts with light reflecting off the inner surfaces of the plates. The resulting intensity pattern shows a prominent peak around one particular wavelength with a possible second peak, third peak, or more peaks, corresponding to second, third, and higher order interference, also possibly being visible.

Existing interferometers are large and unable to be packaged small enough to be used as micro-electro mechanical systems (MEMS). For example, existing interferometers employ plates of the order of 0.5 inches. While the gap between the plates is of the same order as MEMS devices, the actual size of the interferometer is much larger than those of MEMS devices. Furthermore, existing interferometric devices are slow to operate and resolve only a finite region of wavelengths. These and/or other drawbacks exist.

SUMMARY

The following is a non-exhaustive listing of some aspects of the present techniques. These and other aspects are described in the following disclosure.

In some embodiments, a system for operating on incoming light is provided. The system may include at least one of one or more optical elements, a photo-detector, a capacitance detector, a current detector, or one or more processors. The one or more optical elements, upon application of a varying input signal, may cause a change to an optical characteristic of the one or more optical elements resulting in a changing interference pattern produced by incoming light incident on the one or more optical elements. The photo-detector may be configured to detect an intensity of light output from the one or more optical elements during application of the varying input signal. The capacitance detector may be configured to detect a capacitance associated with the optical characteristic of the one or more optical elements during the application of the varying input signal. The current detector may be configured to detect a current drawn by the one or more optical elements during the application of the varying input signal. The one or more processors may be configured to obtain, from the capacitance detector, a plurality of capacitance values representing the capacitance of the one or more optical elements. Alternatively or additionally, the current detector may be configured to obtain a plurality of current values representing the current drawn by, of the one or more optical elements. The one or more processors may be further configured to obtain, from the photo-detector, a plurality of signal values representing the intensity of light output from the one or more optical elements; and generate a plurality of transformation values respectively based on the plurality of capacitance and/or current values.

In some embodiments, a method for operating on incoming light is provided. The method, which may be implemented by one or more processors executing computer program instructions, includes: obtaining, from a capacitance detector configured to detect a capacitance associated with an optical characteristic of one or more optical elements during application of a varying input signal, a plurality of capacitance values representing the capacitance of the one or more optical elements, wherein upon application of the varying input signal, the one or more optical elements cause a change to the optical characteristic thereby resulting in a changing interference pattern produced by incoming light incident on the one or more optical elements; obtaining, from a photo-detector configured to detect an intensity of light output from the one or more optical elements during application of the varying input signal, a plurality of signal values representing the intensity of the light output from the one or more optical elements; and generating a plurality of transformation values respectively based on the plurality of capacitance values, wherein the plurality of transformation values and the plurality of signal values are used to determine a spectrum of the incoming light. In some embodiments, the method further includes determining a current drawn by the one or optical elements, wherein the capacitance is determined based on the current.

BRIEF DESCRIPTION OF THE DRAWINGS

The above-mentioned aspects and other aspects of the present techniques will be better understood when the present application is read in view of the following figures in which like numbers indicate similar or identical elements:

FIG. 1A illustrates a block diagram example of a system for performing interferometric spectroscopy, in accordance with various embodiments;

FIG. 5 illustrates another example of an optical element from a side-view, in accordance with various embodiments;

FIGS. 8A-8H illustrate an example process for fabricating an optical element for performing interferometric spectroscopy, in accordance with various embodiments;

Figure 1B:
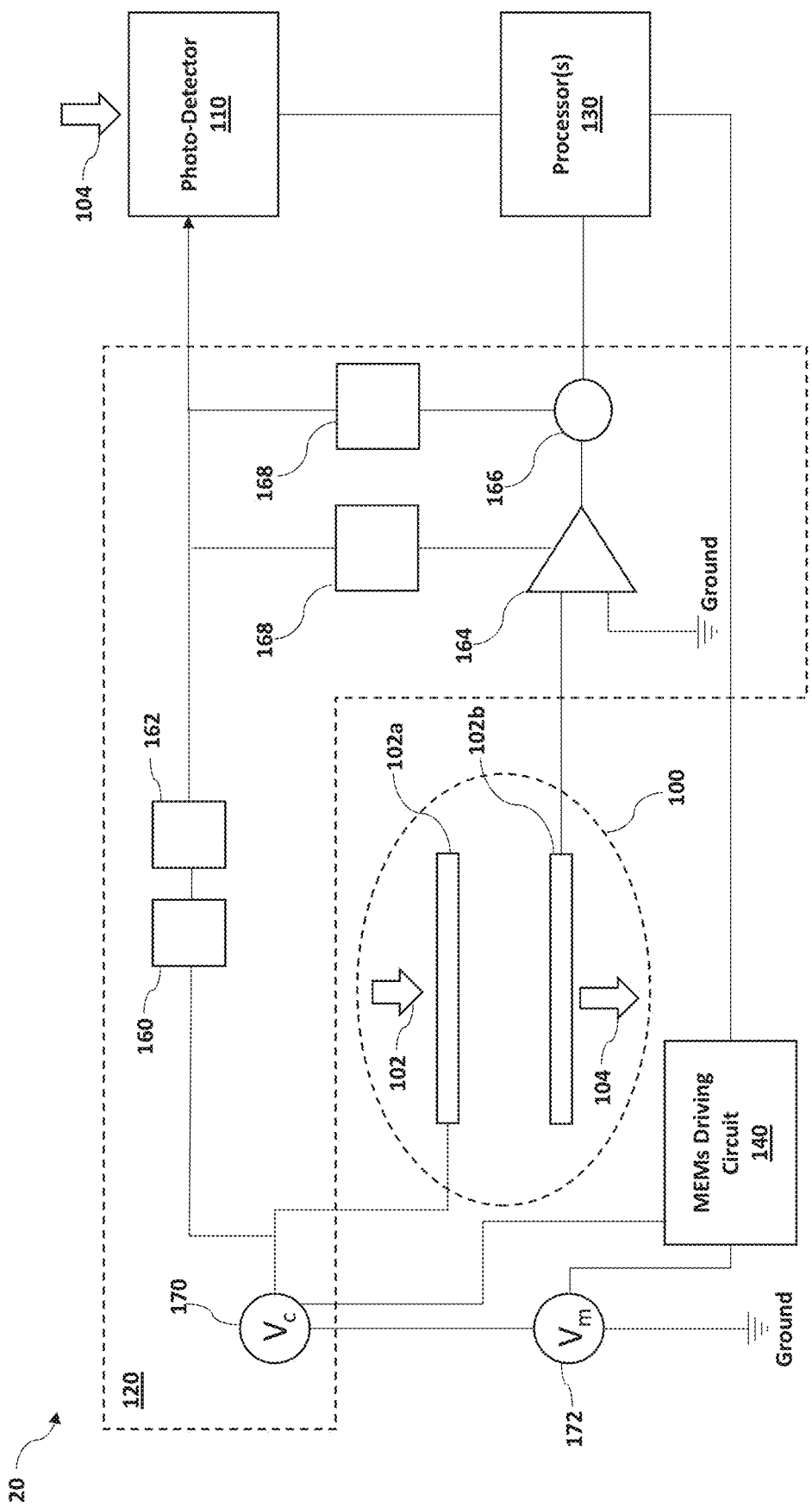
FIG. 1B illustrates an example of the capacitance detector circuitry of the system of FIG. 1A, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventor had to both invent solutions and, in some cases just as importantly, recognize problems overlooked (or not foreseen) by others in the field of spectroscopy and MEMS devices. Indeed, the inventor wishes to emphasize the difficulty of recognizing those problems. Further, because multiple problems are addressed, it should be understood that some embodiments are problem-specific, and not all embodiments address every problem with traditional systems described herein or provide every benefit described herein. That said, improvements that solve one or more permutations of these problems and/or other problem(s) are described below.

The present application relates to systems and methods for obtaining data that can be used to obtain a spectrum of incoming electromagnetic radiation. The incoming electromagnetic (EM) radiation includes wavelengths in the visible range (e.g., 400-700 nm), infrared range (e.g., 700 nm-1 mm), ultraviolet range (e.g., 10 nm-400 nm), or other wavelength ranges. The present application describes miniaturized spectrometers and various applications for such miniaturized spectrometers. In some cases, as few as one miniaturized spectrometer can be used to resolve an entire spectrum of EM radiation, while other cases include more than one miniaturized spectrometer (e.g., 10 or less, 5 or less). Different wavelengths of EM radiation interact with different materials (e.g., partially or fully absorbed). Depending on an object's material composition, different wavelengths of EM radiation will be absorbed or reflected. In some embodiments, the spectrum of the EM radiation that remains, either transmitted or reflected, after interacting with the object can be analyzed to determine the object's material composition.

In some embodiments, the spectrometers described herein are of the order of a few millimeters in length, width, and height, allowing for integration into mobile devices (e.g., smartphones, tablets, smartwatches, etc.). As a result, the number of possible applications for the spectrometers increases exponentially. Some examples of these applications include contactless or near-contactless determinations of biological information (e.g., a blood-oxygen level, cholesterol levels, glucose levels, blood-alcohol levels, etc.), determining a spectrum of light captured by an image using a camera, determining an object's material composition, and more.

Previous techniques required multiple spectrometers to analyze a spectrum of incident EM radiation due to the small wavelength range that previous spectrometers span. Therefore, in order to resolve an entire spectrum of the incoming EM radiation, multiple spectrometers, each tuned for a different, small, range of wavelengths, are needed. Moreover, multiple measurement cycles are needed to capture different ranges of wavelengths of the incident EM radiation for each spectrometer. Additionally, these spectrometers are much larger than what can be integrated into mobile devices, particularly as mobile devices decrease in size and increase in capability. For example, conventional interferometers used to perform spectroscopy use gratings and linear detector arrays and can have a footprint of 0.5-1.0 inches, making integration into modern mobile devices unfeasible. Additionally, conventional interferometers resolve interference patterns in a spatial domain, such as with the Newton rings interference pattern produced by a Fabry-Perot interferometer, or using gratings to spread the spectrum into a spatial pattern.

The systems, devices, and techniques described herein overcome the aforementioned problems associated with conventional spectroscopy devices. In particular, the present application describes interferometers small enough to be integrated into modern mobile devices (e.g., of the order of a few millimeters), while still being capable of obtaining a large portion of the spectrum of incoming EM radiation. Further still, the present application describes techniques for measuring the capacitance between conductive elements of an interferometer making gap determination unambiguous.

FIG. 1A illustrates an example of a system 10 for performing interferometric spectroscopy, in accordance with various embodiments. System 10 includes one or more optical elements 100, a photo-detector 110, a capacitance detector 120, a current detector 125, one or more processors 130, a MEMS driving circuit 140, memory 150, or other components. In some embodiments, system 10 may include additional photo-detectors and/or capacitance detectors, or other components. Incoming EM radiation 102 may be incident on optical element 100. EM radiation, as described herein, may be referred to interchangeably as "light," unless specified otherwise. In some embodiments, EM radiation 102 reflects off of an object prior to being incident on optical element 100. In some embodiments, EM radiation 102 may pass through a portion of an object (e.g., is partially absorbed) prior to being incident on optical element 100. In some embodiments, EM radiation 102 is output directly from a source (e.g., an LED, the Sun, etc.). The object may be composed of one or more materials. For example, the object may be an inanimate object (e.g., a gem, a food, etc.), a portion of a living creature (e.g., a finger of a human for determining blood oxygen levels, a portion of skin where an abnormality to be examined is located, etc.), gases (e.g., the Earth's atmosphere, a portion of the sky, etc.), or other objects.

Optical elements 100, which is described in greater detail below, represents one or more components used to determine a spectrum of EM radiation 102. In some embodiments, optical element 100 is an interferometer. For example, optical element 100 may be a Fabray-Perot interferometer. A Fabray-Perot interferometer, which may also be referred to herein interchangeably as a "Fabray-Perot etalon," or an "etalon," is an optical device that harnesses the wave/particle-like properties of light to produce an interference pattern. In general, Fabray-Perot interferometers include two parallel plates separated by a small gap. The plates generally are transmissive and an inner surface of each plate is reflective or is coated with a reflective material. Light that is incident on the plates will both pass through the plates and reflect off the inner (reflective) surfaces, which subsequently interfere—both constructively and destructively—with one another. The resulting intensity pattern is commonly that of an optical band-pass filter. The transmission coefficient of a Fabry-Perot interferometer is a periodic function of the phase shift induced by the air gap, as seen by Equation 1

$$\delta = 2\pi nd \cos\theta \qquad \text{Equation 1.}$$

In Equation 1, d represents the distance between the inner surfaces of the two parallel plates (also referred to as the "gap"), n is the index of refraction of the gap material (usually air), θ represents the angle of incidence of the incoming EM radiation, and λ represents the wavelength of the EM radiation. The transmission coefficient is maximum when δ=mπ where m is the order of interference, and minimum half way between these values. These peaks in transmission are called fringes (interference pattern).

In some embodiments, EM radiation 104 (e.g., light) is output from optical element 100 and is received by photo-detector 110. Photo-detector 110, which may also be referred to as a "photosensor," is a device configured to detect EM radiation incident thereon, such as EM radiation 104. The transmitted EM radiation (e.g., EM radiation 104) incident on photo-detector 110 is comprised of photons, hence the name "photo-detector." An example of photo-detector 110 includes a charge-coupled device (CCD), however different or alternative types of photo-detectors can be used. In some embodiments, photo-detector 110 is configured to detect incident photons and convert the photons into an electrical signal (e.g., an electrical current).

Figure 4:
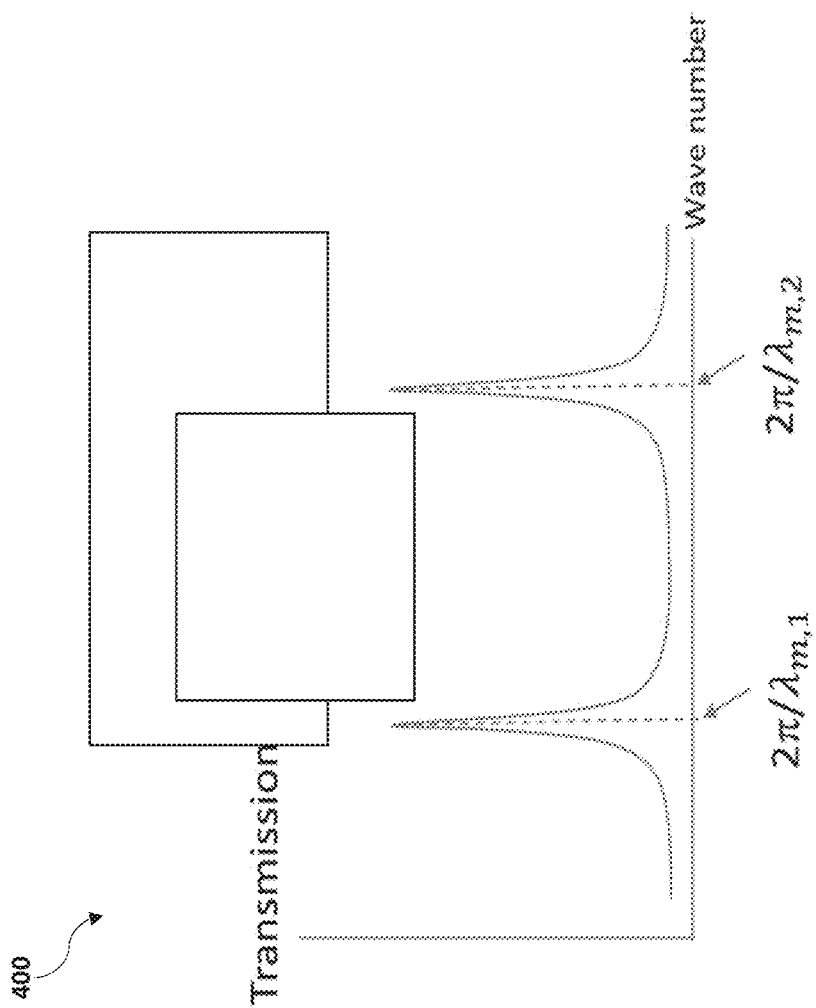
FIG. 4 illustrates an example of a plot depicting a spectral transmission characteristics for an example optical element, in accordance with various embodiments.

EM radiation 104 transmitted from optical element 100 and detected by photo-detector 110 produces an interference pattern. For example, if optical element 100 is a Fabray-Perot interferometer, or a similar type of interferometer, the interference pattern is depicted as a band-pass filter. This characteristic interference pattern may be formed by the incoming EM radiation constructively and destructively interfering with itself, as portions of incoming EM radiation 102 pass through the parallel plates while others portions of incoming EM radiation 102 are reflected by the parallel plates. For example, as seen in FIG. 4 below, the interference is in wave-number space or wavelength space. Regions of low transmission in the interference pattern correspond to destructive interference, whereas regions of high transmission in the interference pattern correspond to constructive interference.

In some embodiments, capacitance detector 120 is configured to detect an instantaneous mutual capacitance of optical element 100. For example, if optical element 100 is a Fabry-Perot etalon, then capacitance detector 120 is configured to detect an instantaneous mutual capacitance between conductive layers of the parallel plates of the Fabry-Perot etalon. The capacitance between the parallel plates of a Fabry-Perot etalon can be measured with various techniques. For example, a time dependent voltage can be applied between the parallel plates and a time evolution of the current drawn by the parallel plates can be monitored. In some embodiments, MEMS driving circuit 140, which is described in greater detail below, is configured to drive the modulation of the parallel plates, whereas capacitance detector 120 is configured to detect an instantaneous capacitance between the parallel plates of the Fabry-Perot interferometer. The capacitance of the parallel plates is a function of a distance between the plates. The larger the distance, or "gap," between the two parallel plates, the weaker the mutual capacitance will be. In some embodiments, capacitance detector 120 is configured to measure the capacitance of optical elements 100 responsive to receiving a trigger. The trigger can be an electrical signal that, when received by capacitance detector 120, causes capacitance detector 120 to measure the capacitance of optical elements 100. One example of a capacitance detector is a capacitance meter, which functions by measuring a voltage across a parallel plate capacitor based on an input (known) current used to charge the capacitor. Additional details regarding capacitance detector 120 is described below with respect to FIG. 1B.

In some embodiments, current detector 125 is configured to detect a current drawn by optical element 100. The current of optical element 100 can be measured with various techniques. For example, a time dependent current can be applied to optical element 100 and a time evolution of the current drawn by the parallel plates can be monitored. The magnitude of the current drawn by optical element 100, and, in particular, the parallel plates of optical element 100 (e.g., for optical element 100 being a Fabry-Perot interferometer), is a function of a distance between the plates. The larger the distance, or "gap," between the two parallel plates, the smaller the drawn current will be. In some embodiments, current detector 125 is configured to measure the current drawn by optical elements 100 responsive to receiving a trigger. The trigger can be an electrical signal that, when received by current detector 125, causes current detector 125 to measure the current drawn by optical elements 100. Additional details regarding current detector 125 is described below with respect to FIG. 1C.

In some embodiments, MEMS driving circuit 140 is configured to drive the modulation of the parallel plates of optical element 100. For example, MEMS driving circuit 140 may be configured to cause the parallel plates of optical element 100 to modulate at a first frequency. The first frequency may be 500 Hz or more, 1,000 Hz or more, 5,000 Hz or more, 10,000 Hz or more, or other frequencies. A user can input the desired frequency via processors 130, or the desired frequency can be retrieved by processors 130 from memory 150, and then may be provided to MEMS driving circuit 140 to effectuate the modulation of the parallel plates of optical element 100. For example, MEMS driving circuit 140 may generate a driving signal, which may be a varying input signal (e.g., a time-dependent signal), whose application to the parallel plates of optical element 100 causes the parallel plates to modulate. The modulation can refer to one of the plates oscillating or both plates oscillating.

In some embodiments, capacitance detector 120 is configured to measure the instantaneous capacitance at a second frequency. In some embodiments, current detector 125 is configured to measure the current drawn at the second frequency. The second frequency may be the same or different than the first frequency. In some cases, the second frequency is selected based on the first frequency, or vice versa. As an example, the second frequency may be 1,000 Hz or more, 2,000 Hz or more, 10,000 Hz or more, 20,000 Hz or more, or other frequencies. In some embodiments, capacitance detector 120 and/or current detector 125 provides a voltage to optical element 100 to facilitate the capacitance and/or current measurement. The voltage provided by capacitance detector 120 and/or current detector 125 acts as a superimposed voltage with respect to the voltage applied to optical element 100 by MEMS driving circuit 140 to cause the parallel plates to modulate. In some embodiments, if the parallel plates are not conductive and optical element 100 includes additional conductive elements, capacitance detector 120 and/or current detector 125 provides the voltage to the additional conductive elements to cause the parallel plates of optical element 100 to modulate. For example, a conductive ring around the optical opening can be used to modulate the parallel plates of optical element 100, or can be used to measure the capacitance of optical element 100, which serves as a proxy for the size of the air gap between the parallel plates.

Processors 130 may be configured to generate a trigger signal causing (i) photo-detector 110 and (ii) capacitance detector 120 and/or current detector 125 to simultaneously measure an intensity of EM radiation 104 and measure a capacitance and/or current of optical elements 100, respectively. In some embodiments, the trigger signal is a square wave, however other waveforms may be used (e.g., sinusoidal wave, sawtooth wave, etc.). The trigger signal can take the form of a series of short pulses (e.g., square pulses). Photo-detector 110, capacitance detector 120, and current detector 125 may each be configured to take a measurement—an intensity measurement, a capacitance measurement, a current measurement—at each pulse. In some embodiments, processors 130 generate the trigger signal such that the trigger signal is produced and output to both photo-detector 110 and capacitance detector 120 at a predetermined frequency. In some embodiments, processors 130 generate the trigger signal such that the trigger signal is produced and output to both photo-detector 110 and current detector 125 at the predetermined frequency. In some embodiments, processors 130 generate the trigger signal such that the trigger signal is produced and output to photo-detector 110, capacitance detector 120, and current detector 125, at the predetermined frequency. The frequency with which photo-detector 110, capacitance detector 120, and/or current detector 125 measure is the same or substantially similar. For example, the trigger signal may be generated such that photo-detector 110 and capacitance detector 120 simultaneously measure the intensity of EM radiation 104 and the capacitance of optical elements 100 at a frequency of 100 Hz or more, 500 Hz or more, 750 Hz or more, 1,000 Hz or more, 10,000 Hz or more, and the like. Similar operations can occur if current detector 125 is used instead of, or in addition to, capacitance detector 120. The high-frequency of the trigger signal corresponds to a large number of measurements being captured by both photo-detector 110, capacitance detector 120, and/or current detector 125. In some embodiments, processors 130 are programed to cause photo-detector 110 and capacitance detector 120, photo-detector 110 and current detector 125, or photo-detector 110, capacitance detector 120, and current detector 125 to trigger a single sampling event for every instance of the periodic trigger signal (e.g., a square wave) going through a rising edge and a falling edge. That way for every full period, two measurement events are triggered. As an example, if capacitance detector 120 is configured to sample the capacitance at a frequency of 10,000 Hz, then measurement events are triggered at a frequency of 20,000 Hz. As described herein, a trigger signal being transmitted to two or more components (e.g., photo-detector 110, capacitance detector 120, current detector 125) of system 10 "simultaneously" corresponds to the digital signal being received by each of the components within a threshold amount of time $\Delta t$ of one another, where $\Delta t$ is approximately 0 seconds (e.g., less than $10^{-3}$ s, less than $10^{-6}$ s, less than $10^{-9}$ s, etc.). In some embodiments, processors 130 may generate and output the trigger signal to account for any lag in signal transmission times such that the trigger signal will be received by photo-detector 110, capacitance detector 120, and/or current detector 125 at substantially the same time (e.g., within time $\Delta t$ of one another). Given that in a preferred embodiment these are MEMS structures, with the distance of conductors being less than a centimeter, and the speed of light being known, the trigger signal will reach the various detectors at times that are not typically able to be differentiated.

In some embodiments, processors 130 are further configured to generate a driving signal that is output to MEMS driving circuit 140. The driving signal indicates a value of an electrical signal that is to be generated by MEMS driving circuit 140 and applied to optical elements 100 to cause one or more components of optical elements 100 to vary, thereby inducing a desired interference pattern. In some embodiments, the driving signal causes the components of optical element 100 to vary at a resonance frequency of optical element 100. In some embodiments, MEMS driving circuit 140 is be configured to generate a varying electrical signal that is applied to optical elements 100. For example, the varying electrical signal may be a time-dependent voltage, a time-dependent current, or a time-dependent charge. During a first phase of the varying electrical signal, a first voltage, current, or charge, may be applied by MEMS driving circuit 140 to optical elements 100, whereas during a second phase of the varying electrical signal, a second voltage, current, or charge may be applied. For example, the varying electrical signal may be a sinusoidal signal, a sawtooth signal, a square-wave signal, or may be of another functional form.

In some embodiments, the varying electrical signal generated by MEMS driving circuit 140 and applied to optical elements 100 is configured to cause a capacitance of an optical characteristic of optical elements 100 to vary. For example, if optical elements 100 include a parallel plate interferometer having a gap of air between the two parallel plates, then application of the varying electrical signal causes the gap to vary. In some embodiments, the gap between the parallel plates represents the optical characteristic of optical element 100. By varying the gap, the distance between the parallel plates changes and thus the capacitance (or current drawn) will also change. As another example, if optical element 100 includes a parallel plate interferometer having a gap between the two parallel plates filled with a birefringent dielectric material, such as a liquid crystal, then application of the varying electrical signal causes the dielectric constant of the dielectric material to vary. By varying the dielectric constant, the capacitance across the parallel plates (or current drawn) will also vary. As still yet another example, if optical element 100 includes a parallel plate interferometer having a gap between the two parallel plates, where the parallel plates are non-conductive and conductive elements are positioned on an external portion of the parallel plates, then application of the varying electrical signal to the conductive elements can cause the conductive elements to generate an electromagnetic force that pushes or pulls the parallel plates towards or away from one another, thereby varying the gap between the parallel plates.

In some embodiments, system 10 includes memory 150 that stores the detected intensities of the light incident on photo-detector 110, and may provide the captured intensities to processors 130 after a measurement cycle (e.g., after processors 130 stop sending the trigger signals). In some embodiments, photo-detector 110 may send each detected intensity to processors 130 in response to photo-detector 110 capturing the intensity. In this case, processors 130 stores each detected intensity measurement in memory 150. In some embodiments, each detected intensity may be stored in a data structure including a timestamp or other metadata indicating a time, order, or other indicator, of when that intensity measurement occurred. In some cases, each trigger signal output from processors 130 may include an identifier indicating a time, order, or other indicator, with which it was produced, and the same identifier may be stored in association with the measured intensity detected by photo-detector 110 in response to receiving that digital signal.

Memory 150 may also store the instantaneous capacitances detected by capacitance detector 120. Memory 150 may also store the instantaneous currents detected by current detector 125. In some embodiments, memory 150 is provided with the detected capacitances and/or detected currents after the measurement cycle. Alternatively, the detected capacitances and/or detected currents may be provided to processors 130 after each measurement by capacitance detector 120, current detector 125, or both, and processors 130 can store the detected capacitances and/or detected currents in memory 150 thereafter. Similarly to the detected intensities described above, in some embodiments, the each detected capacitances and/or detected currents may be stored in a data structure, which may be the same or different from the data structure used to store the detected intensities, including a timestamp or other metadata indicating a time, order, or other indicator, of when that intensity was captured. In some cases, each digital signal output from processors 130 may include an identifier indicating a time, order, or other indicator, with which it was produced, and the same identifier may be stored in association with the instantaneous and/or detected currents capacitances measured by capacitance detector 120 in response to receiving that digital signal.

FIG. 1B illustrates an example of capacitance detector 120 of the system of FIG. 1A, in accordance with various embodiments. For simplicity, and to avoid obfuscating components, current detector 125 is not illustrated. Similar to FIG. 1A, FIG. 1B depicts a system 20 including optical elements 100, photo-detector 110, capacitance detector 120, processors 130, and MEMS driving circuit 140. In FIG. 1B, optical elements 100 may include components, such as a first plate 102a and a second plate 102b. First plate 102a and second plate 102b may represent parallel plates, such as with a Fabry-Perot interferometer. For example, as mentioned above, incoming EM radiation 102 may incident optical element 100. EM radiation 104, on the other hand, represents light emitted by optical element 100 that is incident on photo-detector 110.

In some embodiments, capacitance detector 120 includes a first voltage source 170, which is configured to generate and output a voltage $V_C$ for performing capacitance measurements. First voltage source 170 can operate in conjunction with second voltage source 172, which is used to generate and output a voltage $V_M$ to cause first plate 102a and second plate 102b to modulate. Voltage sources 170 and 172 may be in electrical communication with first plate 102a, however, alternatively, voltage sources 170 and 172 may be in electrical communication with second plate 102b. In some embodiments, voltage $V_C$ operates at a higher frequency than voltage $V_M$. For example, voltage $V_C$ may operate at 10,000 Hz or more, whereas voltage $V_M$ may operate at a frequency of 1,000 Hz or more. In some embodiments, voltage $V_C$ provided by capacitance detector 120 acts as a superimposed voltage with respect to voltage $V_M$ applied to optical element 100 by MEMS driving circuit 140 to cause the parallel plates to modulate. In some embodiments, voltage $V_M$ is greater in magnitude than voltage $V_C$ such that, when measuring the mutual capacitance across plates 102a, 102b, voltage $V_C$ has a negligible effect on the modulation. In some embodiments, a single voltage source is used as opposed to voltage sources 170 and 172. For example, two separate voltages may be superimposed on top of one another and output as a single voltage. In some embodiments, the time-dependent voltage (or voltages) are output to plates 102a or 102b, and a different, constant voltage is applied to the other of plates 102a and 102b.

Voltage sources 170 and 172 may be electrically connected in series to one another, and in parallel to a high-pass filter 160. High-pass filter 160 may be electrically connected to a trigger signal generator 162. In some embodiments, trigger signal generator 162 generates a trigger signal provided to photo-detector 110 to cause photo-detector 110 to measure an intensity of incident light, as described above. The trigger signal produced by trigger signal generator 162 can also be used to facilitate capacitance detector 120 measuring the instantaneous mutual capacitance across plates 102a and 102b. By generating the trigger signal for measuring the intensity of the incident light at photo-detector 110 and measuring the instantaneous mutual capacitance of optical element 100, the two measurement events can occur simultaneously, or substantially simultaneous. In some embodiments, processors 130 are configured to generate the trigger signal instead of, or in conjunction with, trigger signal generator 162. In FIG. 1B, the trigger signal generated by trigger signal generator 162 may be based on voltage $V_C$ and voltage $V_M$. Processors 130 can be used to generate arbitrary trigger signals that are not necessarily related to voltage $V_C$ and voltage $V_M$, which may be used for triggering purposes.

In some embodiments, capacitance detector 120 includes a current/charge integrator 164, which is in electrical communication with second plate 102b of optical element 100. Current/charge integrator 164 additionally can be in electrical communication with the trigger signal produced by trigger signal generator 162. Current/charge integrator 164 can be configured to measure a total amount of charge across plates 102a, 102b by performing a time integration of the current/charge measured during a measurement cycle. In some embodiments, a signal conditioner 168 may be in electrical communication with trigger signal generator 162 and current/charge integrator 164. Signal conditioner 168 may be configured to transform a signal from a first form to a second form. Capacitance detector 120 may also include a sampler 166 which is in electrical communication with current/charge integrator 164 and another instance of signal conditioner 168. In some embodiments, sampler 166 may be configured to perform the measurements of the instantaneous mutual capacitance across plates 102a and 102b for each measurement event, and output the measured capacitance values to processors 130. For example, sampler 166 may measure the capacitance across plates 102a, 102b at a predetermined sampling frequency (e.g., 1,000 Hz, 5,000 Hz, 10,000 Hz, etc.), and may output the measured capacitance value. Together with the measured intensity, performed by photo-detector 110 at the predetermined sampling frequency, processors 130 may resolve the spectrum of the incoming EM radiation 102.

Figure 1C:
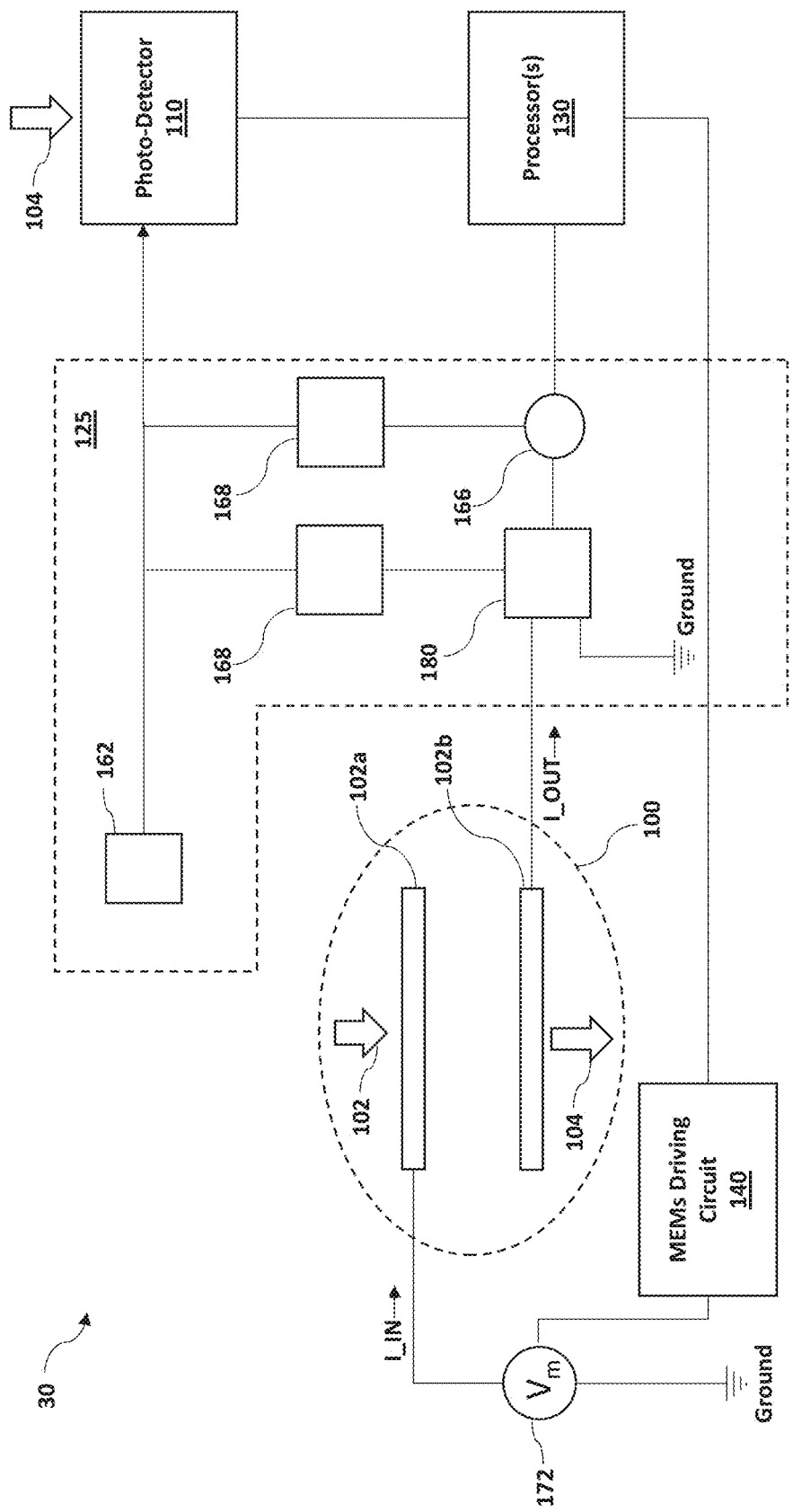
FIG. 1C illustrates an example of the current detector circuitry of the system of FIG. 1A, in accordance with various embodiments.

FIG. 1C illustrates an example of current detector 125 of the system of FIG. 1A, in accordance with various embodiments. For simplicity, and to avoid obfuscating components, capacitance detector 120 is not illustrated. Similar to FIG. 1B, FIG. 1C depicts a system 30 including optical elements 100, photo-detector 110, processors 130, and MEMS driving circuit 140. In some embodiments, system 30 includes current detector 125, which include similar components as capacitance detector 120 of FIG. 1B.

Current detector 125 may include current measuring electronics 180 configured to measure a current output by optical element 100. A current going into optical element 100 may be monitored as plates 102a and 102b are modulated by voltage $V_M$. In some embodiments, voltage source 170 is not included for performing capacitance measurements as, in FIG. 1C, current is instead measured. For example, capacitance detector 120 of FIG. 1B includes current measuring electronics 180. In some embodiments, a current I_IN is input to first plate 102a, and a current I_OUT is output by second plate 102b. The modulation in the current, which can be determined based on current I_OUT may then be used in conjunction with the intensity measurements detected by photo-detector 110 to resolve the spectrum of incoming EM radiation 102. Current detector 125 can use the measured current values to determine a value of the capacitance across first plate 102a and second plate 102b. Then, using the capacitance values and the intensity values determined by photo-detector 110, gap values (e.g., a size of the gap between first plate 102a and second plate 102b) can be determined and used to resolve the spectrum of incoming EM radiation 102. In some embodiments, the current is a function of time. For example, the current may be time-dependent (e.g., sinusoidal), which allows for the capacitance values to be derived from the measured current values.

Figure 2:
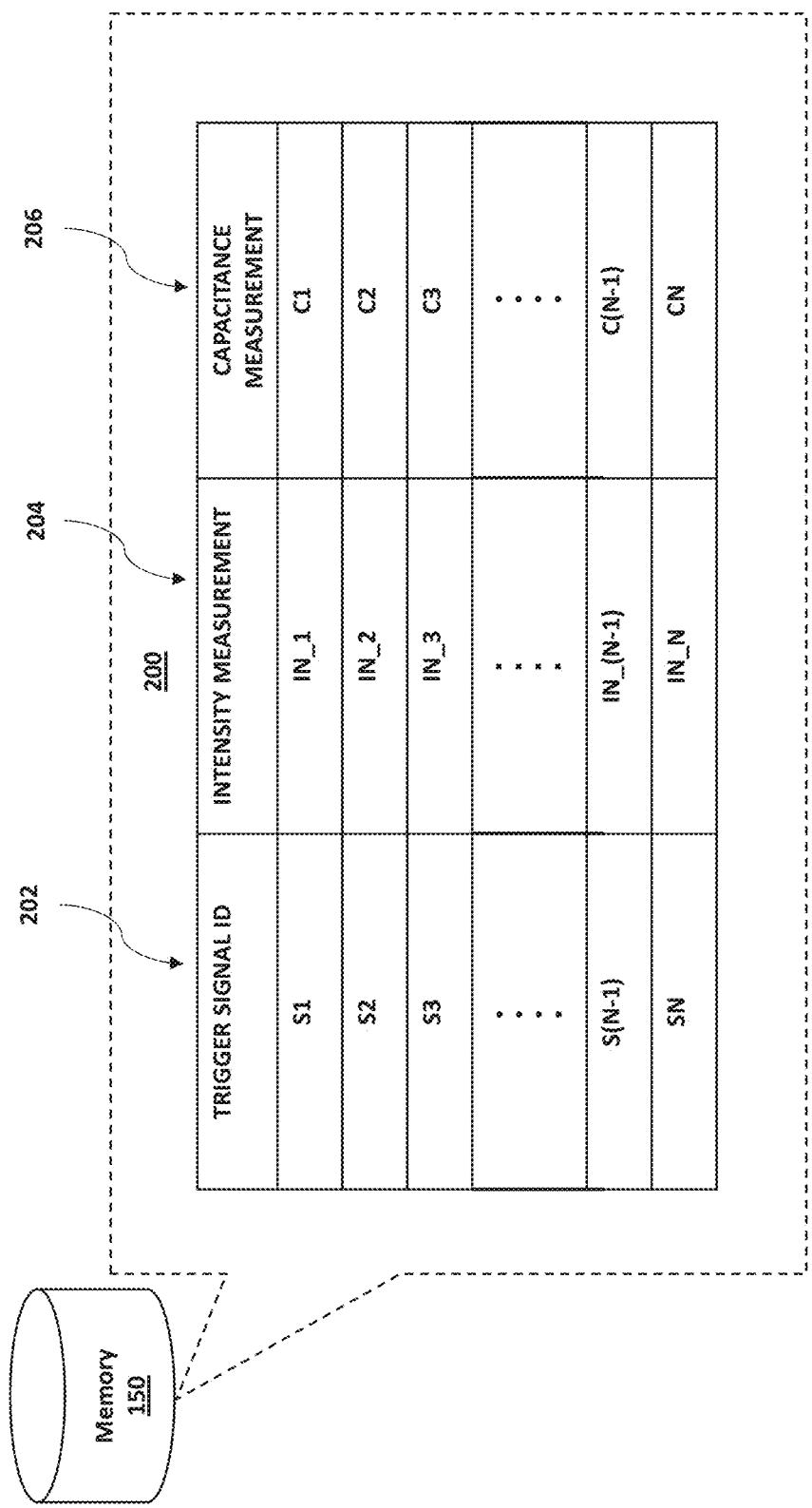
FIG. 2 illustrates an example of a data structure stored in memory including measured intensities and capacitances, in accordance with various embodiments.

FIG. 2 illustrates an example of a data structure 200 stored in memory 150 including measured intensities and capacitances, in accordance with various embodiments. Although not depicted in FIG. 2, an additional column including measured currents can also be included in data structure 200, or in another data structure stored by memory 150. In some embodiments, data structure 200 includes data fields 202, 204, and 206. Data field 202 may include data values for a signal identifier of each trigger signal sent from processors 130 to photo-detector 110 and capacitance detector 120. In some embodiments, signals S1-SN are sent, consecutively, at a predefined temporal interval. For example, signal S1 may be sent at a time t1, signal S2 may be sent at a time t2, signal S3 may be sent at a time t3, and so on. In this example, time t2 may be Δt seconds after time t1, and time t3 may be Δt seconds after time t2. Data field 204 may include data values of an intensity measurement detected by photo-detector 110 in response to receiving a corresponding trigger signal from processors 130. For example, in response to receiving signal S1, photo-detector 110 may measure an instantaneous intensity of emitted EM radiation 104 from optical element 100 that is incident on photo-detector 110, record the measured intensity, and provide the measured intensity to memory 150 whereby the measured intensity can be stored as a data value in data field 204 in association with the corresponding digital signal (e.g., intensity measurement IN_1 corresponding to digital signal S1). Data field 206 may include data values of a capacitance measured by capacitance detector 120 in response to receiving a corresponding signal from processors 130. For example, in response to receiving signal S1, capacitance detector 120 may measure an instantaneous capacitance of optical element 100, record the measured capacitance, and provide the measured capacitance to memory 150 whereby the measured capacitance can be stored as a data value in data field 206 in association with the corresponding digital signal (e.g., capacitance measurement C1 corresponding to digital signal S1). Furthermore, in some embodiments, data structure 200 may include an additional column indicating measured current values (e.g., via current detector 125). Using the measured current values, capacitance measurements C1-CN may be obtained.

Figure 3:
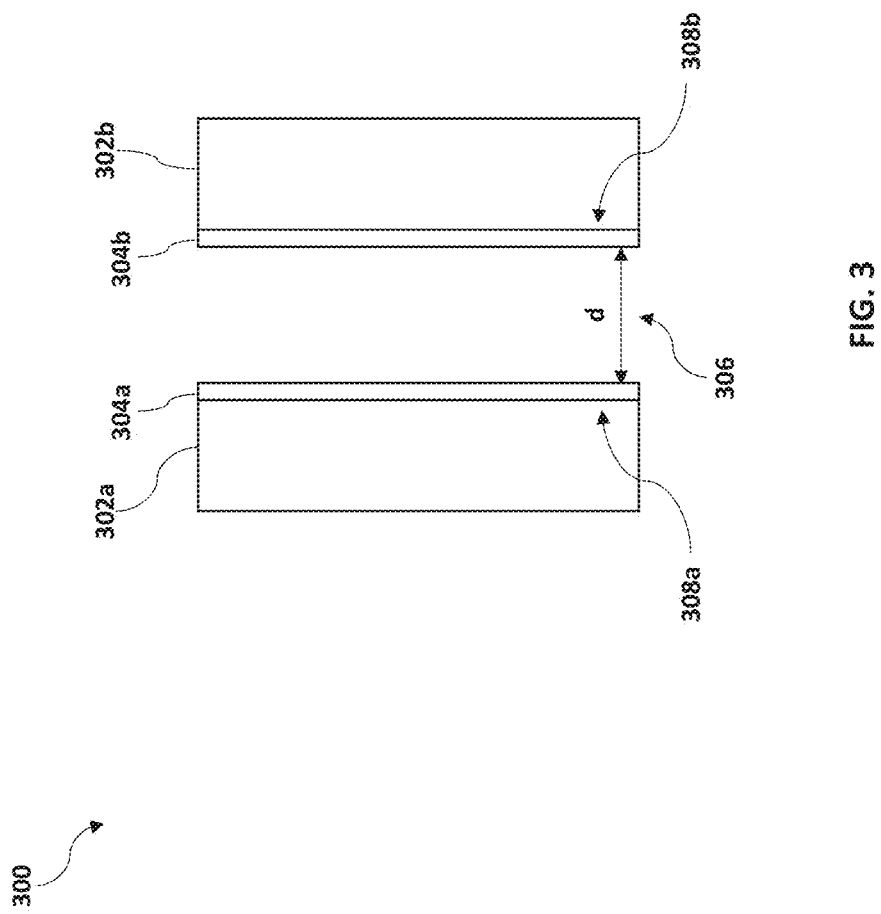
FIG. 3 illustrates an example of an optical element from side-view, in accordance with various embodiments.

FIG. 3 illustrates an example of an optical element 300, in accordance with various embodiments. In some embodiments, optical element 300 represents an example of optical element 100 from FIG. 1. For instance, optical element 300 may be a Fabry-Perot interferometer, however other types of interferometers may be used. In some embodiments, optical element 300 includes one or more components, such as a first plate 302a and a second plate 302b. Optical element 300 may be configured such that first plate 302a and second plate 302b are substantially parallel to one another. In other words, a distance d of a gap 306 between an inner surface 308a of first plate 302a and an inner surface 308b of second plate 302b is substantially constant along a length of plates 302a and 302b. For example, plates 302a and 302b are maintained a distance d±δd, where δd/d is approximately 0. In some embodiments, distance d is can be between 500 Angstroms and 1 micron in size, however distances less than 500 Angstroms or greater than 1 micron can also be used (e.g., approximately 0-2 microns). In some embodiments, first plate 302a and second plate 302b are formed of one or more conductive and/or transparent materials. For example, first plate 302a and second plate 302b may be formed of Indium Tin Oxide (ITO), however other materials, such as, but not limited to, Fluorine doped Tin Oxide (FTO), doped Zinc Oxide, or other transparent conductive oxides, may be used. In some embodiments, as described below, first plate 302a and second plate 302b are formed on one or more non-conductive and transparent materials.

In some embodiments, a thin-layer of reflective material is deposited or affixed to inner surface 308a of first plate 302a and inner surface 308b of second plate 302b. For example, layer 304a, which may be a reflective layer, may be affixed to inner surface 308a of first plate 302a and layer 304b, which may also be a reflective layer, may be affixed to inner surface 308b of second plate 302b. Gap 306 refers to the distance (e.g., distance d) between layer 304a and layer 304b. In some embodiments, layers 304a and 304b are formed of a reflective material, such as a thin metallic film or a dielectric mirror. The composition of layers 304a and 304b may depend on the composition of plates 302a and 302b. For example, if plates 302a and 302b are formed of glass (or other substrates having high-transmissivity), then layers 304a and 304b may be dielectric mirrors deposited on plates 302a and 302b. As another example, a combination of a metallic film and a dielectric mirror may be used to form layers 304a and 304b. Alternatively, in some embodiments, plates 302a and 302b do not include layers 304a and 304b, respectively.

In some embodiments, gap 306 may be varied. For instance, processors 130, described previously with respect to FIG. 1, may be configured to generate and output a driving signal, which is provided to MEMS driving circuit 140. In response to receiving the driving signal, MEMS driving circuit 140 may produce and apply a varying electrical signal to plates 302a and 302b to cause plates 302a and 302b to be attracted to one another. For example, the varying electric signal may be a voltage, current, or charge, and application of the varying electrical signal to plates 302a and 302b, if plates 302a and 302b are formed of a conductive material, can cause plates 302a and 302b to become attracted to one another, thereby decreasing distance d of gap 306. The attraction of plates 302a and 302b causes gap 306 between plates 302a and 302b to decrease such that distance d becomes smaller. In some embodiments, distance d between plates 302a and 302b is 5,000±500 Angstroms. However, distance d may be other distances, such as, but not limited to, between 1,000-2,000 Angstroms, 2,000-4,000 Angstroms, 3,000-7,000 Angstroms, 5,000-10,000 Angstroms, approximately 2 microns, or other ranges. After varying electric signal is removed or otherwise no longer applied to plates 302a and 302b, plates 302a and 302b may return to their respective original positions, as described in greater detail below with respect to FIGS. 7A and 7B.

In some embodiments, optical element 100, 300 includes an electromechanical actuator, such as a piezoelectric actuator. The piezoelectric actuator may be used to cause plates 302a and 302b to move closer to one another or apart from one another in response to a mechanical adjustment.

In some embodiments, optical element 300 is designed such that a relatively narrow range of wavelengths of incoming EM radiation (e.g., EM radiation 102) are able to pass through, as detailed below with respect to FIG. 4, and the incoming EM radiation is periodic in wavenumber. For example, FIG. 4 includes an example of a plot 400 depicting a transmission window for an example optical element, such as optical element 300 of FIG. 3. As seen in FIG. 4, plot 400 includes two peaks corresponding to two wavenumbers of a particular wavelength of incoming EM radiation. As distance d of gap 306 is varied, the peaks of each will move to the right or left. The sharpness of each of the peaks depicted in plot 400 can depend on the design of layers 304a and 304b. For example, each peak can vary in shape and size depending on whether layers 304a and 304b are formed using metallic films, dielectric mirror stacks, or other materials/compositions. Additionally, the position of the peaks, with respect to wavenumber, will depend on distance d of gap 306.

FIG. 5 illustrates another example of an optical element 500, in accordance with various embodiments. Similar to optical element 300 of FIG. 3, optical element 500 includes a first plate 502a and a second plate 502b, which may be the same or similar to first plate 302a and second plate 302b of FIG. 3, respectively. First plate 502a and second plate 502b may or may not be formed of a non-conductive material. Optical element 500 also includes a first layer 504a affixed to an inner surface 508a of first plate 502a and a second layer 504b affixed to an inner surface 508b of second plate 502b. Layers 504a, 504b and inner surfaces 508a, 508b may be the same or similar to layers 304a, 304b and inner surfaces 308a, 308b, respectively, of FIG. 3, and the previous description may apply. Further still, in some embodiments, plates 502a and 502b, including layers 504a and 504b affixed to inner surfaces 508a and 508b, respectively, are separated by a gap 506 of distance d.

In some embodiments, optical element 500 includes a dielectric material 510 disposed in gap 506. For example, dielectric material 510 may be formed of a liquid crystal. In some embodiments, application of a varying electrical signal, such as a voltage, current, or charge, to dielectric material 510 causes an index of refraction of dielectric material 510 to vary. The net result can be substantially equivalent to changing distance d of gap 506 (such as described above for FIG. 3) without altering the actual distance d. The optical length of an optical element is a function of the distance between the parallel plates and the index of refraction of the material located in-between the parallel plates. For optical element 300 of FIG. 3, the material located between the parallel plates (e.g., plates 302a, 302b) is air, which has an index of refraction of 1.00. Therefore, the optical length of optical element 300 is directly proportional to distance d of gap 306. However, alternatively, if the distance is held fixed, such as for optical element 500 of FIG. 5, then the optical length of optical element 500 can be varied by varying the index of refraction of the material between plates 502a, 502b. To vary the index of refraction, appropriate dielectric material 510 can be injected into gap 506, and the varying electrical signal can be applied to dielectric material 510. In some embodiments, the instantaneous capacitance of optical element 500 is measured to obtain a value of the dielectric constant of dielectric material 510 at that particular measurement instance, a voltage applied to optical element 500 at that particular measurement instance, or both.

Figure 6B:
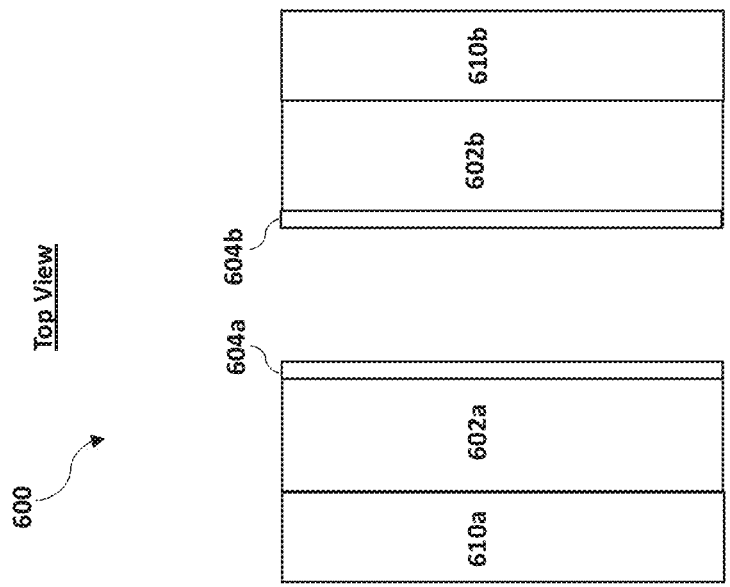
FIGS. 6A and 6B illustrate another example of an optical element from side-view and a top-view, respectively, in accordance with various embodiments.
Figure 6A:
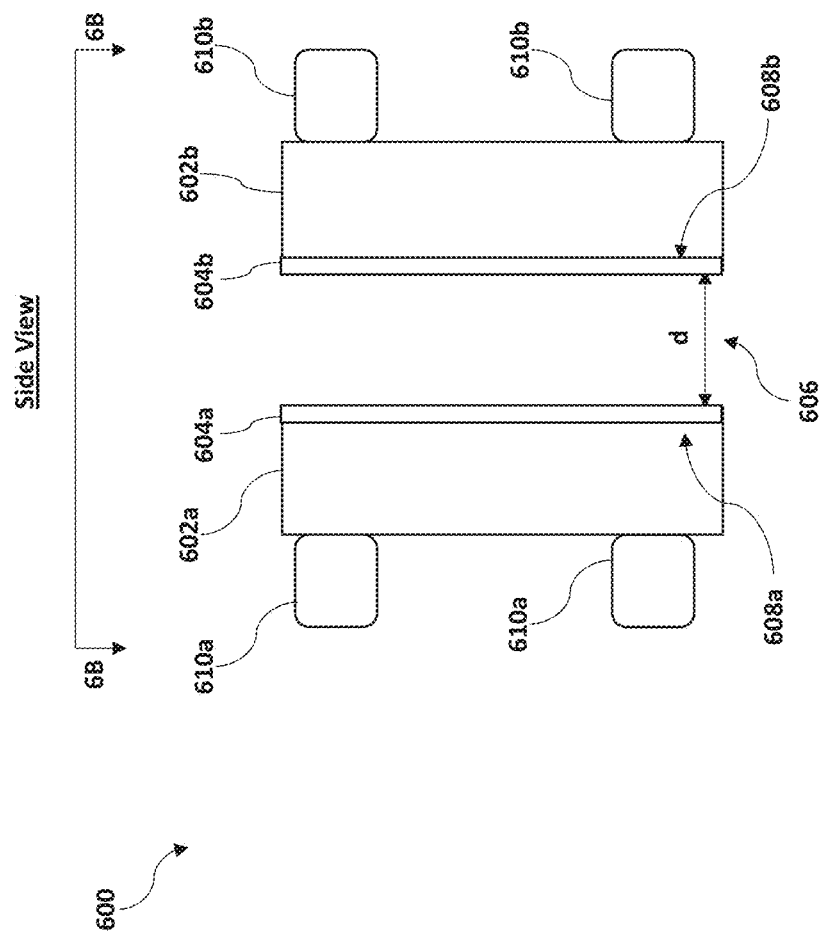

FIGS. 6A and 6B illustrate another example of an optical element 600 from side-view and a top-view, respectively, in accordance with various embodiments. In FIG. 6A, the side view of optical element 600 is depicted, including a first plate 602a and a second plate 602b, a first layer 604a affixed to an inner surface 608a of first plate 602a, and a second layer 604b affixed to an inner surface 608b of second plate 602b. Plates 602a, 602b and layers 604a, 604b of optical element 600 may be the same or similar to plates 302a, 302b and layers 304a, 304b of optical element 300, with the exception that plates 602a, 602b may be formed of a non-conductive material. In some embodiments, conductive elements 610a and 610b are placed along an exterior of plates 602a and 602b. In response to application of a varying electrical signal (e.g., a time-dependent a voltage, current, or charge) to conductive elements 610a and 610b, an attractive force is produced that causes plates 602a, 602b to move closer to one another, thereby decreasing a distance d of gap 606. In response to no longer applying the voltage, current, or charge to conductive elements 610a and 610b, the attractive force is also removed, thereby allowing plates 602a, 602b to return to their original position.

In FIG. 6B, conductive elements 610a and 610b are depicted as being rectangular in shape and positioned at an exterior surface of plates 602a and 602b, respectively. However, alternative configurations are also possible. For example, conductive elements 610a and 610b may be circular (or "ring"-like) and may surround plates 602a and 602b. In some embodiments, only a single conductive element or more than two conductive elements may be used. For example, instead of conductive element 610a being placed towards a "top" end of plates 602a and 602b, and conductive element 610b being placed towards a "bottom" end of plates 602a and 602b, a single conductive element positioned equatorially may be used.

Figure 7A:
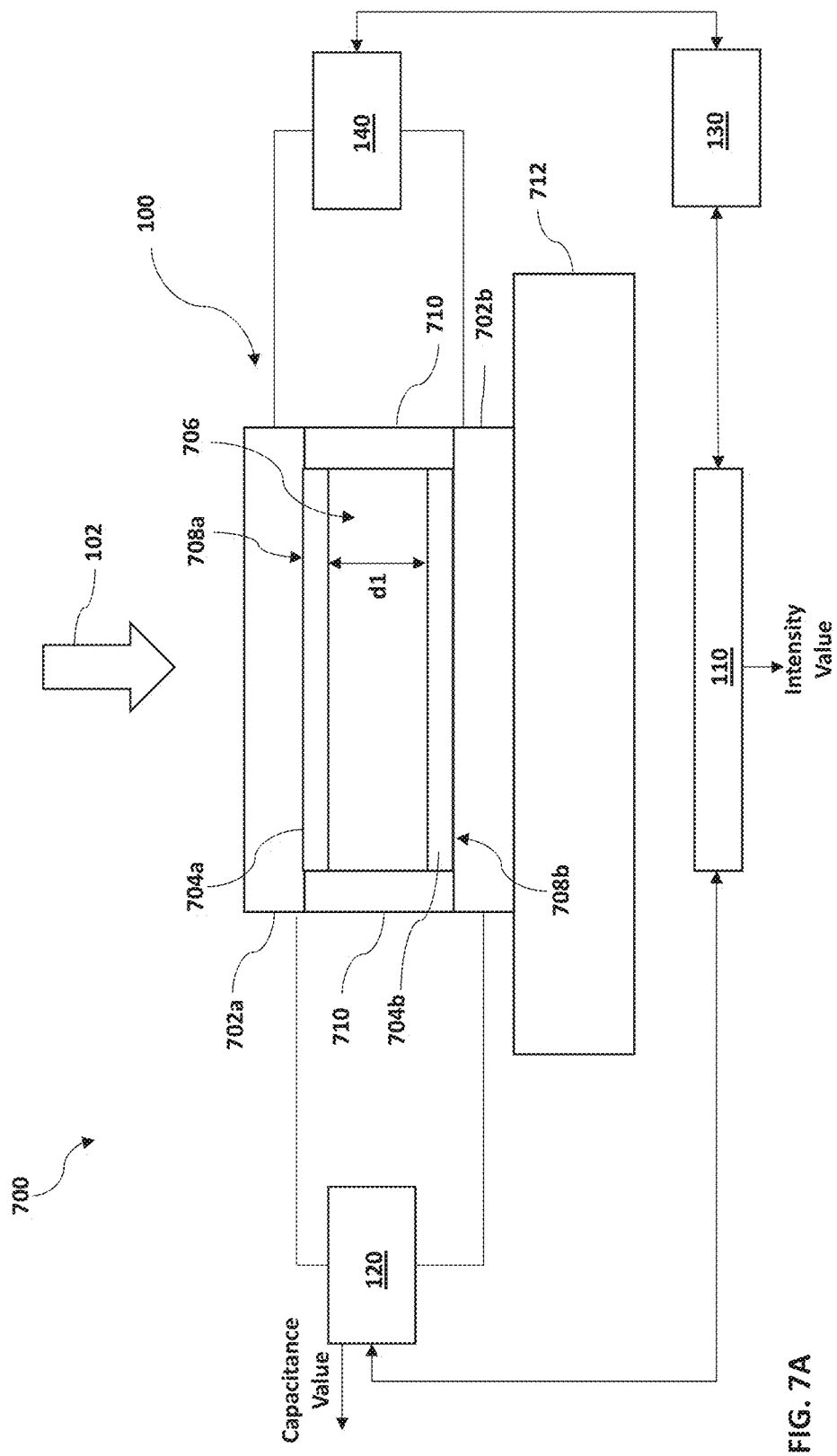
FIGS. 7A and 7B illustrate an example of systems for performing interferometric spectroscopy, in accordance with various embodiments.
Figure 7B:
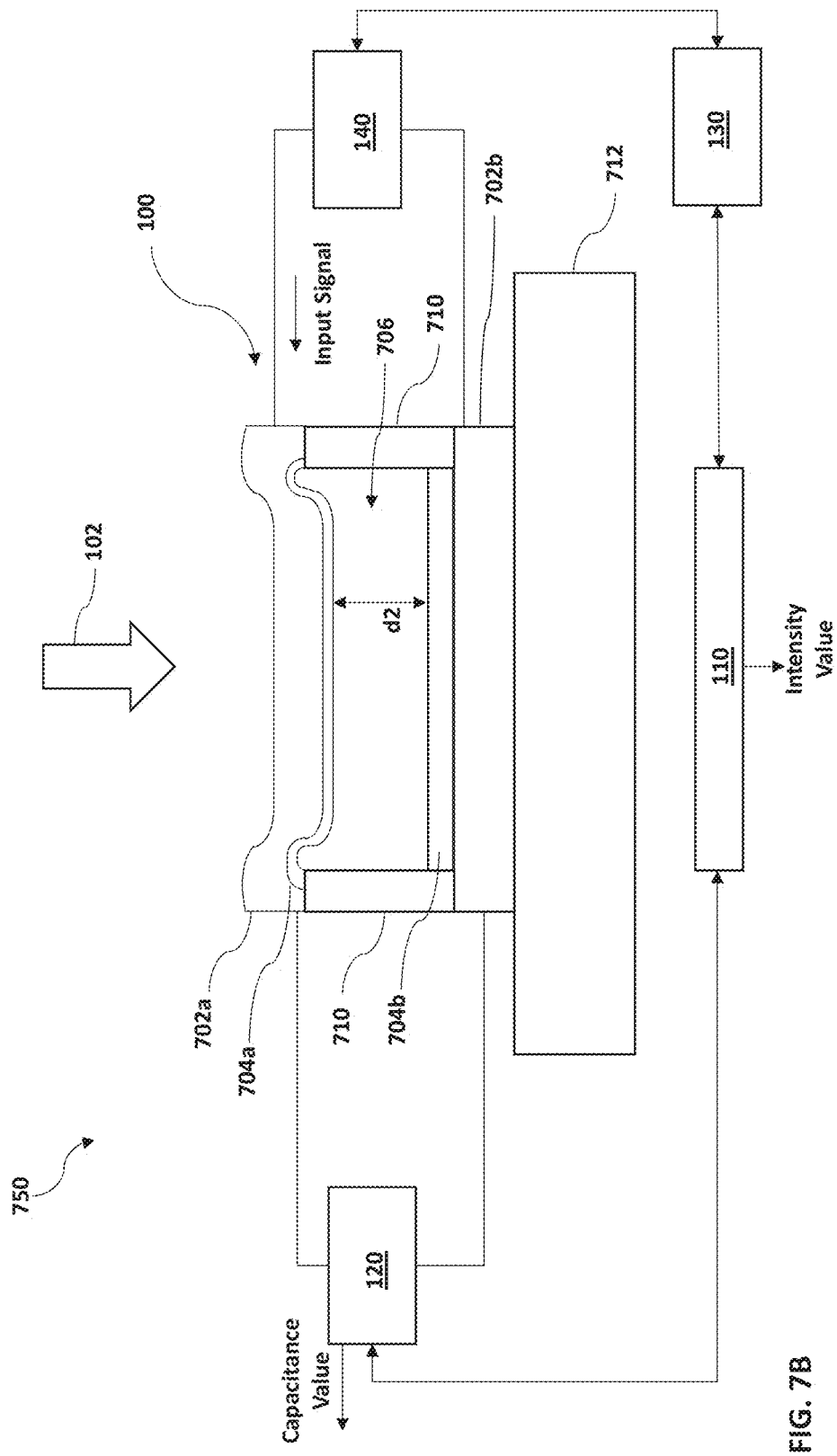

FIGS. 7A and 7B illustrate an example of systems 700, 750, respectively, for performing interferometric spectroscopy, in accordance with various embodiments. In some embodiments, system 700 includes optical element 100, photo-detector 110, capacitance detector 120, processors 130, MEMS driving circuit 140, or other components. For instance, current detector 125 may also be included in systems 700 and 750. For example, systems 700 and 750 may include current detector 125 in addition to, or in lieu of, capacitance detector 120. However, to avoid obfuscating elements, current detector 125 is not illustrated in systems 700 and 750. For example, instead of including capacitance detector 120, systems 700 and 750 may include current detector 125. In some embodiments, systems 700 and 750 may include both capacitance detector 120 and current detector 125. In some embodiments, optical element 100 may be the same or similar to optical element 300, however other configurations (e.g., optical elements 500, 600), may be used.

In FIG. 7A, optical element 100 may include a first plate 702a and a second plate 702b, which are substantially parallel to one another, and which have a first layer 704a and a second layer 704b affixed, respectively, to inner surface 708a of first plate 702a and inner surface 708b of second plate 702b. In some embodiments, plates 702a, 702b and layers 704a, 704b may be the same or similar to plates 302a, 302b and layers 304a, 304b of optical element 300, and the previous description may apply. For example, plates 702a, 702b may be formed of a conductive material such that plates 702a, 702b form a parallel plate capacitor. In some embodiments, optical elements 100 of FIG. 7 includes spacers 710 located on a lateral end of plates 702a, 702b, which are configured to suspend first plate 702a including first layer 704a above second plate 702b including second layer 704b to create a gap 706 having a distance d1. In some embodiments, gap 706 may be a distance d1 when the varying electrical signal (e.g., voltage, current, or charge) is applied to optical element 100.

In some embodiments, system 700 includes a substrate 712 on which optical element 100 is disposed. Substrate 712 may be formed of a transparent material, such as glass, such that EM radiation emitted from optical element 100 (e.g., EM radiation 104) is able to pass through substrate 712 and incident photo-detector 110. In some embodiments, substrate 712 is configured to shape or focus the EM radiation output from optical element 100 towards photo-detector 110. For example, substrate 712 may act as a lens to focus EM radiation 104 to incident photo-detector 110. In some embodiments, substrate 712 is configured to provide mechanical support and stability for optical element 100, and system 700 may include an additional lens disposed between substrate 712 and photo-detector 110 to focus the EM radiation output from optical element 100 towards photo-detector 110.

In some embodiments, optical element 100 (and similarly optical elements 300, 500, 600), may be fabricated by depositing, patterning, and etching various films and materials on a substrate (e.g., substrate 712). Gap 706 may be formed by first depositing a sacrificial layer in its place and then etching away the sacrificial layer. This process may be the same or similar to known MEMS fabrication techniques and is described in more detail below with respect to FIG. 8.

In some embodiments, a varying electrical signal is applied to optical element 100. The varying electrical signal may be a voltage, a current, or a charge. In some embodiments, the varying electrical signal is generated by MEMS driving circuit 140 in response to receipt of a driving signal from processors 130. The varying electrical signal may include different phases that apply different signals. For example, varying electrical signal may be a time-dependent signal, formed as a step-function, a sinusoidal function, or another time-dependent function. In this example, during a first phase of the varying electrical signal, a first electrical signal is applied to optical element 100 (e.g., 0 V, in case of voltage) whereas during a second phase, a second electrical signal is applied to optical element 100 (e.g., +/−3 V, in case of voltage).

As seen in FIG. 7B, when the varying electrical signal is applied to optical element 100 (e.g., a voltage applied between plates 702a and 702b when plates 702a and 702b are conductive), an electrostatic force may be created which causes plates 702a and 702b to be attracted to one another. The attractive electrostatic force causes plate 702a to deform, as seen in FIG. 7B, thereby decreasing gap 706 such that the distance between plates 702a and 702b decreases from distance d1 seen in FIG. 7A to distance d2 of FIG. 7B. As mentioned above, plate 702a may be suspended above second plate 702b by spacers 710 such that first plate 702a, as well as first layer 704a, may deform as a result of the attractive electrostatic force. The deformation of first plate 702a and first layer 704a may result in the changed distance d1 of gap 706. In some embodiments, when the input signal is removed, the attractive electrostatic force between first plate 702a and second plate 702b also is removed, and first plate 702a and first layer 704a may return to their original position as seen in FIG. 7A. Persons of ordinary skill in the art will recognize that, in some embodiments, an input signal may alternatively be applied to cause first plate 702a and first layer 704a to stay in a first position, such as that shown in FIG. 7A, whereby gap 706 has a first distance d1, and removal of the input signal causes first plate 702a and first layer 704a to deform to a second position as seen in FIG. 7B. Alternative input signal configurations are also possible, and the aforementioned are used as illustrative examples. When the attractive electrostatic force causes first plate 702a and first layer 704a to deform, a tension is also created. This is a similar effect as that of a compressed spring, i.e., the restoring force of the spring due to compression of the spring seeks to cause the spring to stop being compressed. In some embodiments, the mass of first plate 702a and first layer 704a may cause a time lag between an instant when the varying electrical signal is removed from optical element 100 and when first plate 702a and first layer 704a return to the original position (e.g., as seen in FIG. 7A). The time lag may occur due to squeezed air effect of the air present in air gap 706. However, because of the high frequency with which the capacitance measurements are performed (e.g., 10,000 Hz), any time lag that may occur has negligible effect on the capacitance measurements of optical element 100. In some embodiments, evacuating all air from optical element 100 is used to rid optical element 100 of any time lag and/or unwanted squeezed air affect.

As mentioned previously, in some embodiments, the varying electrical signal used to cause first plate 702a and first layer 704a to deform, thereby varying the distance of gap 706, is a time-dependent signal. For example, a sinusoidal signal may be used, having a frequency $\omega$, to apply a voltage, current, or charge to optical element 100 and thereby causing the deformation of first plate 702a and first layer 704a. Thus, the varying electrical signal may be periodically oscillating between a first input signal value (e.g., voltage +V, in case of voltage) and a second signal value (e.g., voltage −V) over a time period characterized by frequency ω. The frequency ω may be, for example, 100 Hz or more, 500 Hz or more, 750 Hz or more, 1,000 Hz or more, and the like. Thus, at any given time, the value of the input signal applied to optical element 100 may vary, and, as a result, a distance of gap 706 at any given time may also vary. In some embodiments, the frequency with which plates 702a and 702b modulate is smaller than the frequency with which the mutual capacitance across plates 702a and 702b, or the current output by optical element, is measured. For example, plates 702a and 702b may be modulated at a frequency of 1,000 Hz, whereas capacitance detector 120 may be configured to measure the mutual capacitance across plates 702a and 702b at a frequency of 100,000 Hz.

In some embodiments, to determine an optical characteristic of optical element 100, such as a value (e.g., a distance) of gap 706 at any instant, an instantaneous capacitance measurement of optical element 100 is obtained. For example, capacitance detector 120 may measure a capacitance across first plate 702a and second plate 702b. In some embodiments, to determine an optical characteristic of optical element 100, such as a value (e.g., a distance) of gap 706 at any instant, an instantaneous current measurement of optical element 100 is obtained. As the varying electrical signal is time dependent, the current measurements may be used to derive the capacitance, which in turn can be used to derive a size of gap 706 at an instant. Some cases include capacitance detector 120 measuring an amount of charge drawn by optical element 100 (e.g., an effective parallel plate capacitor formed by first plate 702a and second plate 702b) as a function of time. In some embodiments, the capacitance at any instant is a function of gap 706 (e.g., the distance between plates 702a and 702b). As an example, the distance of gap 706 may be computed based on an inverse of the measured capacitance values. In some embodiments, capacitance detector 120 is triggered to sample (e.g., measure) an instantaneous capacitance of optical element 100. For example, processors 130 may generate a trigger signal that causes capacitance detector 120 to measure the capacitance of optical element 100. In some embodiments, current detector 125 is triggered to sample an instantaneous current output from optical element 100. For example, processors 130 may generate a trigger signal that causes current detector 125 to measure the current output from optical element 100. Using the current measurements, a capacitance of optical element 100 may be determined.

Processors 130 may generate and output the trigger signal at a predefined time interval, such as every Δt seconds. For example, as seen above with reference to FIG. 2, signal S1 may be a first trigger signal output by processors 130 and provided to capacitance detector 120, which subsequently measures a capacitance value C1. As another example, signal S1 may be a first trigger signal output by processors 130 and provided to current detector 125, which subsequently measures a value of the output current from optical element 100. Additionally, the trigger may also be provided to photo-detector 110 to measure an intensity of incident EM radiation on photo-detector 110. For example, responsive to the first trigger signal, signal S1, photo-detector 110 measures an intensity IN_1 of EM radiation incident thereon. Furthermore, some embodiments include capacitance detector 120 or current detector 125 being used to generate or cause the trigger signal to be generated based on the voltage applied to plates 702a and 702b to cause plates 702a and 702b to modulate, as well as the voltage applied to plates 702a and 702b to measure the capacitance across them, as detailed above with respect to FIG. 1B.

Some embodiments include sampling the capacitance values and the intensity values detected by capacitance detector 120 and photo-detector 110, respectively, over many cycles of the input signal (e.g., the input voltage, current, or charge). Some embodiments include sampling the current values and the intensity values detected by current detector 125 and photo-detector 110, respectively, over many cycles of the input signal (e.g., the input current). Sampling over a large number of cycles can improve signal-to-noise ratios (SNR).

As detailed above, optical element 100 may be relatively small in size. For example, optical element 100 may be of the order of a few millimeters (e.g., 5 mm by 5 mm by 2 mm). In some embodiments, optical element 100 uses electromechanical actuators, such as piezo-electric actuators, to vary gap 706. In such cases, optical element 100, and in particular plates 702a, 702b and layers 704a, 704b, are generally much larger in dimensions (e.g., of the order of 0.5 inches or greater) and plates 702a, 702b are much stiffer. Plates 702a and 702b may also be formed of a same or similar material, however some cases include plates 702a and 702b being formed of different materials. Furthermore, the correlation between the input signal applied to the electromechanical actuators and the distance of gap 706 may be determined by sampling the time varying input signal applied to the electromechanical actuators or by directly measuring the capacitance of optical element 100 to determine a value of the distance d of gap 706 and simultaneously measuring the intensity of the incident EM radiation on photo-detector 110.

In some embodiments, the aforementioned devices and techniques may be implemented in an image capture device, such as a camera. For example, a high-speed camera may operate as a spectrometer camera where every pixel of the imager is capable of resolving an entire, or a portion of, spectrum of the incoming EM radiation (e.g., light). By applying the input signal such that the driving frequency of the input signal varies periodically, gap 706 can change in time (e.g., distance d will vary in time). The trigger signal may be used to simultaneously capture, at discrete time intervals, the instantaneous capacitance value of optical element 100 and may also simultaneously take a full image frame of the incoming EM radiation 102. As mentioned previously, the incoming EM radiation 102 may reflect or pass through an object with which a material composition is to be determined for, or a spectrum of the incoming radiation may be determined. Therefore, in this example, a full instantaneous image may be produced for every instantaneous gap 706 of optical element 100. In some embodiments, to increase the SNR, the simultaneous measurements of the capacitance and the intensity of the EM radiation may be repeated over many cycles of the driving input signal. Each pixel of the image may have a signal that is mathematically related to the transmission characteristics of optical element 100 and the spectrum of incoming EM radiation 102, and some embodiments include producing or resolving a full spectrum of incoming EM radiation 102 for a corresponding pixel. When all pixels are processed this way, a full spectrometric image can be obtained. In some embodiments, optical element 100 and the camera can be driven very fast by appropriate fast electronics as in a high frame rate camera (e.g., 100 or more frames per second, 500 or more frames per second, 1000 or more frames per second, and the like) to obtain a very fast spectroscopic image of an object or scene.

FIGS. 8A-8H illustrate an example process for fabricating an optical element for performing interferometric spectroscopy, in accordance with various embodiments. Each of FIGS. 8A-8H depicts a portion of the fabrication process, however additional steps may be performed in addition to, or instead of, the described processes.

FIG. 8A illustrates a first step of the example fabrication process. FIG. 8A includes a substrate 802, which is obtained for use for fabricating the interferometer. In some embodiments, substrate 802 is formed of a transparent material. For example, substrate 802 may be formed of glass, Silicon, or other materials. The material selected for substrate 802 may depend on the wavelength range to be examined with the interferometer after being fabricated. For example, if the interferometer is to be used to examine EM radiation in the visible wavelength range (e.g., 400-700 nm), then substrate 802 may be formed from glass. As another example, if the interferometer is to be used to examine EM radiation in the infrared wavelength range (e.g., 700 nm-1 mm), then substrate 802 may be formed from Silicon.

FIG. 8B includes a first layer 804 deposited on a surface of substrate 802. In some embodiments, first layer 804 is a metallic mirror or a dielectric mirror. In some embodiments, first layer 804 may be formed of a transparent conducting material, such as ITO, FTO, or other materials.

FIG. 8C includes a structural material 806 deposited on a surface of first layer 804 opposite that with which first layer 804 contacts substrate 802. Structural material 806 can be used to form one or more structures residing on first layer 804. The structures to be formed can enable the plates of the optical element (e.g., plates 702a, 702b) to be separated by a distance d. Moreover, the structures will allow an air gap to be formed between the plates of the optical element.

FIG. 8D includes structures 808 formed on first layer 804 after patterning and etching of structural material 806 is performed. In some embodiments, structures 808 correspond to spacers 710 of FIGS. 7A and 7B. A height of structures 808 may be equal to a desired initial size of the air gap for optical element 100. For example, a height of structures 808 may be equal to distance d. While FIG. 8 depicts two instances of structures 808, additional structures may also be included as a result of the patterning and etching of structural material 806.

FIG. 8E includes a sacrificial layer 810 deposited over structures 808, first layer 804, and substrate 802. Sacrificial layer 810 will be removed in subsequent process steps to form the air gap. It can also be used to help smooth and normalize a height of a new layer to be added on top of structures 808 such that the new layer will be substantially parallel to first layer 804 and substrate 802.

FIG. 8F shows a planarization process step 812 being performed to sacrificial layer 810. As mentioned above, planarization process step 812 can be used to ensure that further layers to be added are parallel with first layer 804 and substrate 802.

FIG. 8G includes a second layer 814 and a plate 816 deposited on planarized layers 812 and 808 such that second layer 814 and plate 816 are substantially parallel to first layer 804 and substrate 802. In some embodiments, second layer 814 is formed of a substantially similar material as first layer 804. For example, second layer 814 may be a metallic or dielectric mirror. In some embodiments, plate 816 is formed of a substantially similar material as substrate 802. For example, plate 816 may be formed of glass or ITO.

FIG. 8H depicts a completed structure where sacrificial layer 810 has been etched away. As a result of the etching, an air gap is now present in the region between structures 808, first layer 804, and second layer 814. This air gap region can allow plate 816 to modulate in response to receipt of a driving signal, as described above with reference to FIGS. 7A and 7B.

Figure 9A:
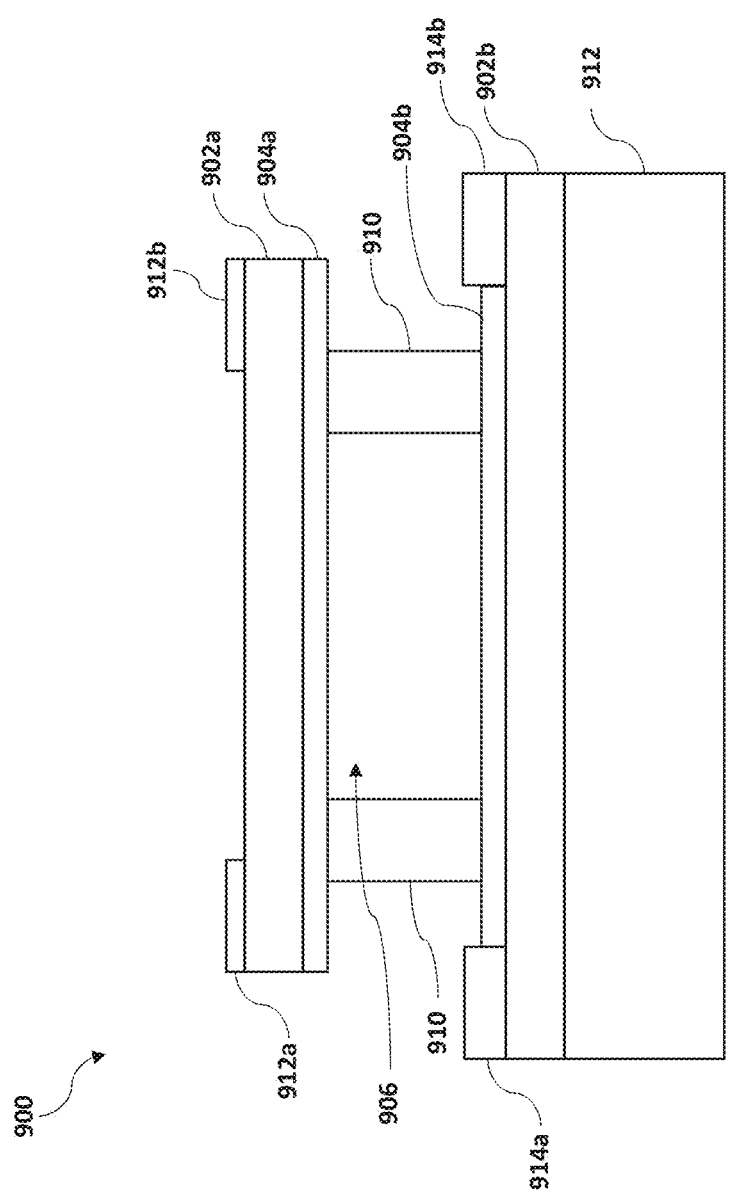
FIGS. 9A and 9B illustrate additional example optical elements for performing interferometric spectroscopy, in accordance with various embodiments.
Figure 9B:
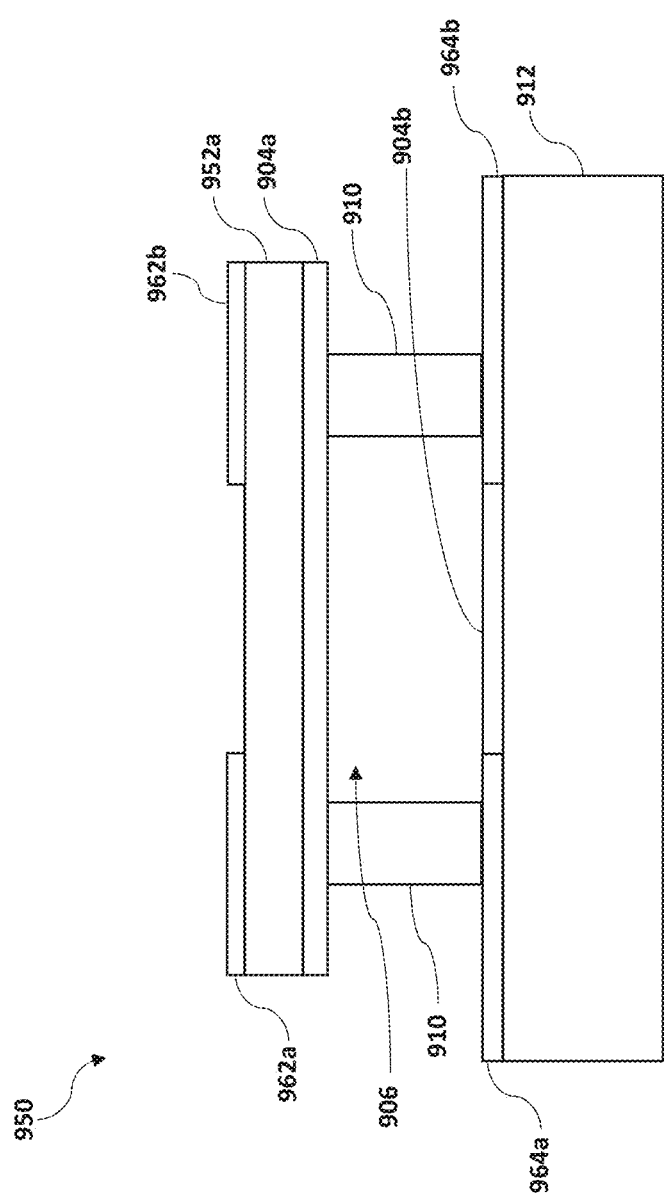

FIGS. 9A and 9B illustrate additional example optical elements 900, 950, respectively, for performing interferometric spectroscopy, in accordance with various embodiments. In some embodiments, optical element 900 includes a first plate 902a and a second plate 902b. First plate 902a and second plate 902b may both be formed from a conductive transparent material. For example, first plate 902a and second plate 902b may be formed from ITO. On an inner surface of first plate 902a may be a first layer 904a and on an inner surface of second plate 902b may be a second layer 904b. Layers 904a and 904b may be deposited on plates 902a and 902b such that layers 904a and 904b face one another and are substantially parallel to one another (and plates 902a and 902b, respectively). In some embodiments, first layer 904a and second layer 904b are each formed of a multi-layer mirror, metallic mirror, or a combination thereof.

First plate 902a and first layer 904a may be separated from second plate 902b and second layer 904b by spacers 910 forming an air gap 906. Air gap 906 may be of a distance d in size when no deformation of first plates 902a and first layer 904a occurs. As mentioned above with respect to FIGS. 8A-8H, air gap 906 may be formed also as a result of the fabrication process to create optical element 900.

In some embodiments, second layer 902b may reside on a substrate 912, and can provides structural support for optical element 900. Substrate 912 may be formed of a transparent material such as glass or Silicon. The particular material used for substrate 912 may depend on the wavelength range of the incident EM radiation to be analyzed. For example, for EM radiation in the visible wavelength range (e.g., 400-700 nm), substrate 912 may be formed of glass. As another example, for EM radiation in the IR wavelength range (e.g., 700 nm-1 mm), substrate 912 may be formed from Silicon.

Many of the elements described above with respect to optical element 900 are the same or similar to the corresponding elements described with respect to optical elements 100, 300, 500, and 600, and some of the details have not been reproduced for brevity. However, any of the features mentioned above with respect to optical elements 100, 300, 500, or 600 may also be characteristic of optical element 900.

In some embodiments, optical element 900 further includes conductive elements, such as conductive elements 912a and 912b, located on first plate 902a and conductive elements 914a and 914b located on second plate 902b. Conductive elements 912a and 912b, as well as conductive elements 914a and 914b may be located on opposite sides of first plate 902a and second plate 902b, respectively. For example, conductive element 912a may be located at a first end of first plate 902a (e.g., a left side), whereas conductive element 912b may be located at a second end of first plate 902a (e.g., a right side). Similarly, conductive element 914a may be located at a first end of second plate 902b, while conductive element 914b may be located at a second end of second plate 902b. In some embodiments, conductive elements 912a and 912b are located on an opposite side of first plate 902a as that of first layer 904a. However, conductive elements 914a and 914b may be located on a same side of second plate 902b as that of second layer 904b. In the latter case, second layer 904b may reside on only a portion of an upper surface of second plate 902b such that conductive elements 914a and 914b also are capable of residing on the upper surface of second plate 904b. If the plates are circular in shape when viewed from above, then the elements 912a and 912b are the same elements; similarly 914a and 914b are the same in this situation.

Conductive elements 912a, 912b, 914a, and 914b may each be formed of a same or similar conductive material to allow electrical access to optical element 900. For example, conductive elements 912a, 912b, 914a, 914b may be silver, gold, or other conductive materials. Conductive elements 912a, 912b, 914a, 914b may also be formed as conductive pads or rings, which may be deposited on a surface of first plate 902a and second plate 902b, respectively, during the fabrication process (e.g., as described with respect to FIGS. 8A-8H), or after the fabrication process. Conductive elements 912a, 912b, 914a, 914b can allow for one or more components of system 10, 20, described above, to be in electrical communication with optical element 900. For example, voltage source 170 may be in electrical communication with first plate 902a via conductive elements 912a and 912b to induce a charge onto first plate 902a. In some embodiments, some or all of conductive elements 912a, 912b, 914a, 914b can be in electrical communication with current/charge integrator 164 and sampler 166 to facilitate measuring a mutual capacitance across plates 902a and 902b. Thus, the various electrical signals (e.g., a current, voltage, charge) can be input to optical element 900 via one or more of conductive elements 912a, 912b, 914a, 914b, and, furthermore, one or more measurements (e.g., capacitance measurements, current measurements) can be obtained via one or more of conductive elements 912a, 912b, 914a, 914b. In some embodiments, the varying input signal used to cause the modulation of plates 902a and 902b may be provided to conductive elements 912a, 912b, 914a, 914b via a first set of inputs, whereas the trigger signal with which a current or capacitance is measured using current detector 125 or capacitance detector 120, may be provided to conductive elements 912a, 912b, 914a, 914b via a second set of inputs. In some embodiments, a constant input signal (e.g., charge, voltage) may be applied to some of conductive elements 912a, 912b, 914a, 914b, whereas a varying input signal may be applied to other ones of conductive elements 912a, 912b, 914a, 914b.

In some embodiments, one or more of capacitance detector 120, current detector 125, processors 130, and MEMS driving circuit 140 are configured to provide a varying input signal to conductive elements 912a, 912b, 914a, 914b to cause a distance between plates 902a and 902b to vary, such as described above with respect to FIGS. 7A and 7B. For example, MEMS driving circuit 140 may be configured to generate and/or output a varying input signal (e.g., a varying charge, a varying voltage, a varying current) that varies over a period of time. As the input signal varies, an electrostatic force between plates 902a, 902b, and layers 904a, 904b, changes, which causes a size of air gap 906 to vary. For instance, during a first phase of the varying input signal, the electrostatic force can cause first layer 904a and first plate 902a to be attracted to second layer 904a and second plate 902b, a size of air gap 906 decreases. During a second phase of the varying input signal, the electrostatic force decreases, and thus first layer 904a and first plate 902a are less attracted to second layer 904a and second plate 902b, thereby causing the size of air gap 906 to increase (or return to a previous position). In some embodiments, MEMS driving circuit 140 is configured to apply the varying input signal to conductive elements 912a and 912b and apply a constant signal to conductive elements 914a and 914b. For example, a constant voltage may be applied to conductive elements 914a and 914b to fix second plate 902b and second layer 904b at a particular charge or voltage, and the varying input signal may be applied to conductive elements 912a and 912b to allow the charge or voltage of first plate 902a and first layer 904a to vary.

FIG. 9B illustrates another optical element 950. In some embodiments, aspects of the components of optical element 950 are the same or similar to the components of optical element 900, and the previous descriptions apply.

In some embodiments, optical element 950 includes a first plate 952a, but does not include a second plate. First plate 952a may be formed from a non-conductive transparent material. For example, first plate 952a may be formed from Silicon Oxide. On an inner surface of first plate 952a may be a first layer 904a. Opposite first plate 952a may be substrate 912, which may include second layer 904b. Similar to optical element 900 of FIG. 9A, layers 904a and 904b may be deposited on plate 952a and substrate 912 such that layers 904a and 904b face one another and are substantially parallel to one another. In some embodiments, first layer 904a and second layer 904b are each formed of a multi-layer mirror, metallic mirror, or a combination thereof. Additionally, first layer 904a and second layer 904b may be separated by spacers 910 to form an air gap 906 having a distance din size.

In some embodiments, optical element 950 further includes conductive elements, such as conductive elements 962a and 962b, located on first plate 952a and conductive elements 964a and 964b located on substrate 912. Conductive elements 962a and 962b, as well as conductive elements 964a and 964b may be located on opposite sides of first plate 952a and substrate 912, respectively. For example, conductive element 962a may be located at a first end of first plate 952a (e.g., a left side), whereas conductive element 962b may be located at a second end of first plate 952a (e.g., a right side). Similarly, conductive element 964a may be located at a first end of substrate 912, while conductive element 964b may be located at a second end of substrate 912. In some embodiments, conductive elements 962a and 962b are located on an opposite side of first plate 952a as that of first layer 904a. However, conductive elements 964a and 964b may be located on a same side of substrate 912 as that of second layer 904b. In the latter case, second layer 904b may reside on only a portion of an upper surface of substrate 912 such that conductive elements 964a and 964b also are capable of residing on the upper surface of substrate 912. Furthermore, in some embodiments, because no conductive plate is included on substrate 912, as was the case in FIG. 9A, a size of conductive elements 964a and 964b may be larger than a size of conductive elements 914a and 914b.

In some embodiments, conductive elements 962a, 962b, 964a, and 964b are the same or similar to conductive elements 912a, 912b, 914a, and 914b of FIG. 9A. Additionally, or alternatively, conductive elements 962a, 962b, 964a, and 964b may be further configured to facilitate the modulation of plate 952a to cause a size of air gap 906 to vary. For example, instead of applying an input electrical signal to the parallel plates to cause one plate to deform thereby decreasing the size of air gap 906, such as in the example depicted above with respect to FIGS. 7A and 7B, a current/voltage/charge can be applied to some or all of conductive elements 962a, 962b, 964a, and 964b to cause modulation of plate 952a and first layer 904a, which is described above with respect to FIGS. 6A and 6B. Furthermore, in some embodiments, additional conductive elements may be included in optical element 950 in addition to conductive elements 962a, 962b, 964a, and 964b such that some of the conductive elements facilitate the modulation of first plate 952a and first layer 904a while others facilitate measurements of the mutual capacitance of optical element 950.

Figure 10B:
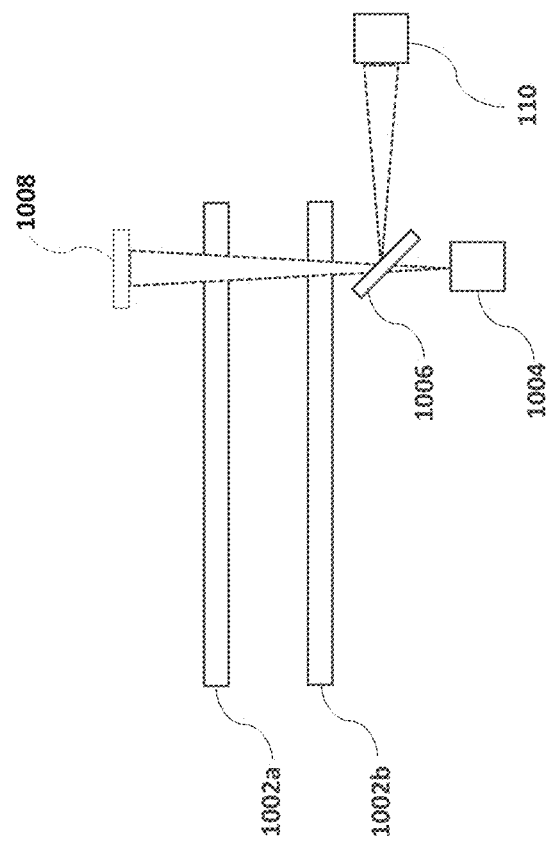
FIGS. 10A and 10B illustrate examples of alternate techniques for measuring a gap of an interferometer, in accordance with various embodiments.
Figure 10A:
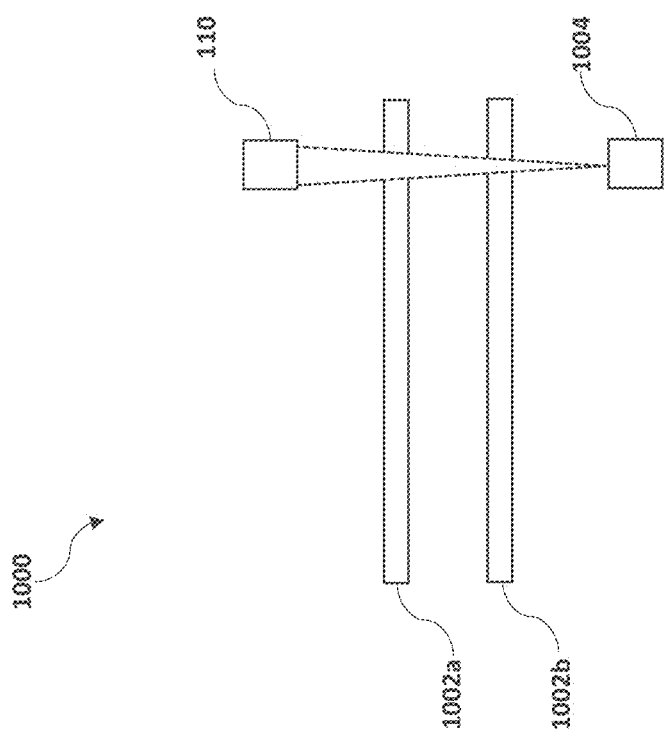

FIGS. 10A and 10B illustrate examples of alternate techniques for performing interferometric spectroscopy, in accordance with various embodiments. In FIG. 10A, a system including a first plate 1002a and a second plate 1002b is shown. In some embodiments, first plate 1002a and second plate 1002b may be part of an interferometer, such as a Fabry-Perot interferometer. First plate 1002a and second plate 1002b may form a parallel plate capacitor. System 1000 further includes a light source 1004, such as a light emitting diode (LED), laser or other source. In some embodiments, light source 1004 is configured to emit a beam of light that will traverse first plate 1002a and second plate 1002b, and is detectable by photo-detector 110. A positioning of light source 1004 and photo-detector 110 can be varied. In some embodiments the detector 110 is a linear detector array.

In some embodiments, an interferometric approach can be used to measure a gap between first plate 1002a and second plate 1002b. Similar to the systems described above, a charge, current, or voltage can be applied to plates 1002a, 1002b to cause modulation that varies the size of the gap between plates 1002a, 1002b. As plates 1002a, 1002b modulate, and thus the size of the gap varies, light source 1004 can emit light which can be detected by photo-detector 110. In some embodiments, the intensity of the detected light varies based on a value of the gap (e.g., a distance d between plates 1002a, 1002b). Using the intensity measurements, which may or may not be taken in conjunction with the capacitance measurements measuring the mutual capacitance across plates 1002a, 1002b, a value of the gap between plates 1002a, 1002b can be resolved. The measured intensity may correspond to the reflected light. In some embodiments, photo-detector 110 is a linear detector array.

In system 1050 of FIG. 10B, a similar setup is illustrated, with the exception that photo-detector 110 is arranged to be orthogonal to a direction of the light emitted by light source 1004. For instance, system 1050 may include a beam splitter 1006 that causes some of the light emitted by light source 1004 to be directed toward plates 1002a, 1002b and to a mirror 1008, while some of the light is directed toward photo-detector 110.

Figure 11:
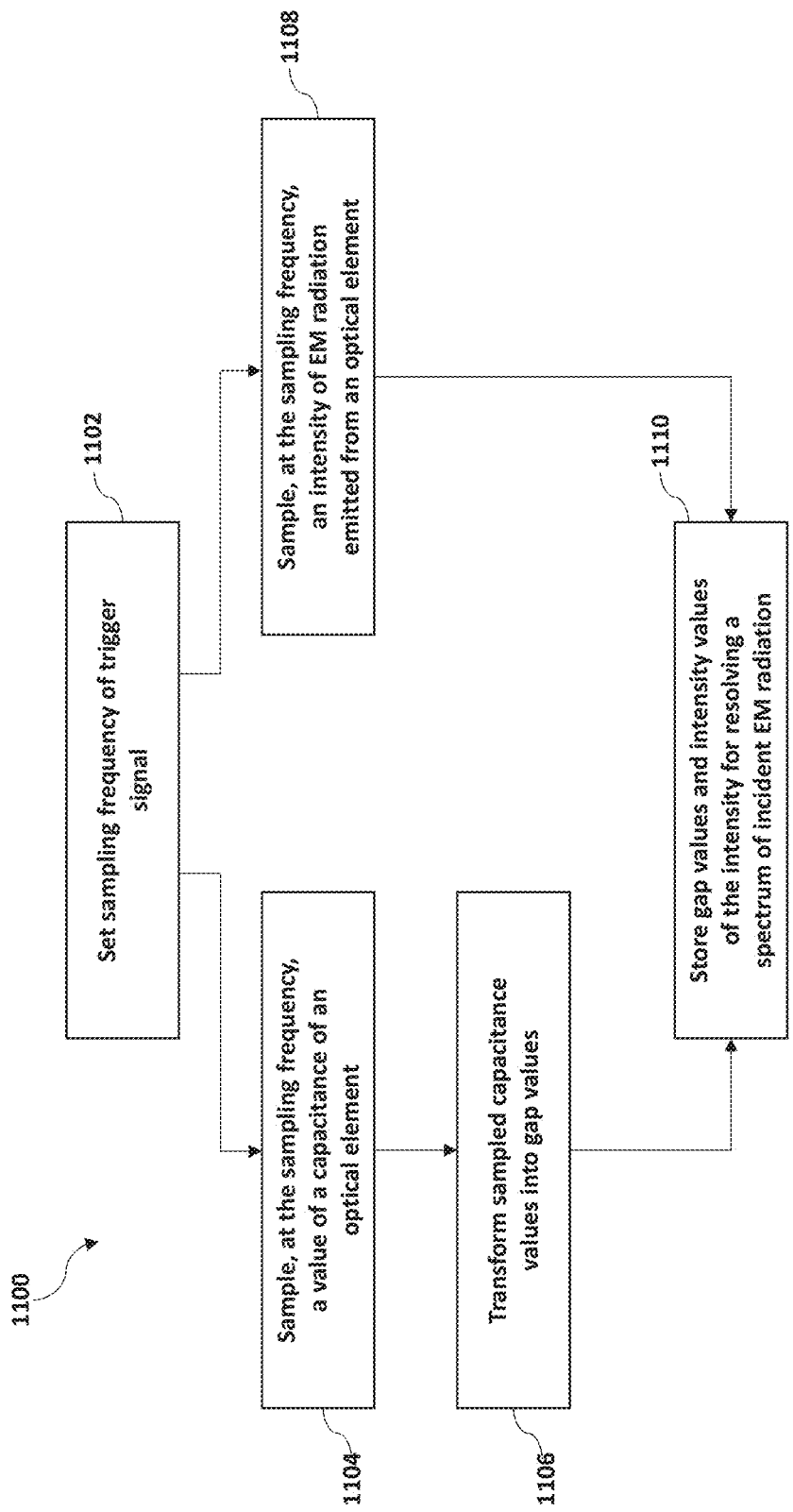
FIG. 11 illustrates an example flowchart of a process for obtaining data for resolving a spectrum of incident light, in accordance with various embodiments.

FIG. 11 illustrates an example flowchart of a process 1100 for obtaining data for resolving a spectrum of incident light, in accordance with various embodiments. In some embodiments, process 1100 begins at step 1102. At step 1102, a sampling frequency of a trigger signal is set. The sampling frequency represents a frequency with which processors 130 may generate and output the trigger signal that causes photo-detector 110, capacitance detector 120, and/or current detector 125 to measure an instantaneous intensity of EM radiation 104 emitted from optical element 100 and incident on photo-detector 110, measure an instantaneous capacitance across parallel plates of optical element 100 (e.g., plates 102a, 102b), and/or measure an instantaneous current drawn by optical element 100, respectively. As an example, the sampling frequency may be 100 Hz or greater, 500 Hz or greater, 1,000 Hz or greater, etc. After setting the sampling frequency, the trigger signal may be sent simultaneously to photo-detector 110 and capacitance detector 120. In some embodiments, capacitance detector 120 is configured to measure the instantaneous capacitance of a proxy element, such as conductive elements 610a, 610b of FIGS. 6A and 6B, conductive elements 912a, 912b, 914a, 914b of FIG. 9A, or conductive elements 962a, 962b, 964a, 964b of FIG. 9B.

At step 1104, a value of a capacitance of optical element 100 is sampled at the sampling frequency. In some embodiments, capacitance detector 120 is configured to measure an instantaneous capacitance value of optical element 100 in response to receipt of a trigger signal from processors 130. For example, capacitance detector 120 may measure a capacitance value C1 between plates 702a, 702b in response to receiving a trigger signal S1. As another example, capacitance detector 120 may measure a capacitance value of conductive elements 912a, 912b, 914a, 914b of FIG. 9A. Alternatively, a value of the current drawn by optical element 100 is sampled at the sampling frequency, and the capacitance of optical element 100 may be determined based on the sampled current. In some embodiments, current detector 125 is configured to measure an instantaneous current value of optical element 100 in response to receipt of a trigger signal from processors 130.

At step 1106, the sampled capacitance values are transformed into transformation values. For instance, the transformation values can represent gap values. In some embodiments, the sampled capacitance values, such as capacitance values C1-CN of FIG. 2, is used to determine values of gap 706. As mentioned previously, the capacitance of optical element 100 is proportional to distance d of gap 706. In some embodiments, processors 130 is configured to retrieve the measured capacitance values (e.g., capacitance values C1-CN) stored in memory 150 (or directly from capacitance detector 120) and transform each capacitance value into a gap value or distance of gap 706.

At step 1108, which is performed simultaneously with step 1104, an intensity of EM radiation transmitted through optical element 100 is sampled at the sampling frequency. In some embodiments, photo-detector 110 is configured to measure an intensity of the EM radiation transmitted through optical element 100 that is incident on photo-detector 110 in response to the trigger signal from processors 130. For example, photo-detector 110 may measure an intensity IN_1 of the emitted EM radiation from optical element 100 in response to receiving trigger signal S1.

At step 1110, the gap values and the intensity values are stored. For example, the gap values and the intensity values may be stored in memory 150, such as in data structure 200. The gap values and the intensity values may then be used to resolve a spectrum of the EM radiation (e.g., EM radiation 102) incident on optical element 100.

The reader should appreciate that the present application describes several independently useful techniques. Rather than separating those techniques into multiple isolated patent applications, applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present application should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this patent application, the word "may" or "can" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive. Limitations as to sequence of recited steps should not be read into the claims unless explicitly specified. Features described with reference to geometric constructs, like "parallel," should be construed as encompassing items that substantially embody the properties of the geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

A1. A system for performing time-resolved interferometric spectroscopy on incoming light, comprising: one or more optical elements that, upon application of a varying input signal thereto, cause a change to an optical characteristic of the one or more optical elements, thereby resulting in a changing interference pattern produced by the incoming light incident on the one or more optical elements; a photo-detector configured to detect an intensity of light output from the one or more optical elements during application of the varying input signal; a capacitance detector configured to detect a capacitance associated with the optical characteristic during the application of the varying input signal; and one or more processors configured to: obtain, from the capacitance detector, a plurality of capacitance values representing the capacitance of the one or more optical elements, obtain, from the photo-detector, a plurality of signal values representing the intensity of the light output from the one or more optical elements, and generate a plurality of transformation values respectively based on the plurality of capacitance values.

A2. The system of embodiment A1, wherein the one or more optical elements comprise: a first plate and a second plate disposed parallel to the first plate such that a gap between the first plate and the second plate is formed, wherein the optical characteristic comprises a size of the gap which changes as a result of the application of the varying input signal.

A3. The system of embodiment A2, wherein the one or more processors are further configured to: allow selection of a wavelength of the incoming light for detection; and determine a presence of the wavelength of the incoming light using some of the plurality of transformation values and some of the plurality of signal values.

A4. The system of embodiment A2, wherein the one or more processors are further configured to: allow selection of a plurality of wavelengths of the incoming light for detection; and determine a presence of the plurality of wavelengths of the incoming light at the plurality of wavelengths using some of the plurality of transformation values and some of the plurality of signal values.

A5. The system of embodiment A2, wherein: a metallic film or dielectric material is disposed on an inner surface of each of the first plate and the second plate; and each of the first plate and the second plate are formed of glass.

A6. The system of embodiment A2, wherein: the first plate is a first conductive plate formed of a conductive transparent material; the second plate is a second conductive plate formed of the conductive transparent material; and multi-layer thin films forming a reflective surface are disposed on an inner surface of each of the first conductive plate and the second conductive plate.

A7. The system of embodiment A2, wherein: the first plate is affixed to a substrate and the second plate is suspended above the first plate at a first distance; the varying input signal comprises a first electrical signal applied to the one or more optical elements during a first phase and a second electrical signal applied to the one or more optical elements during a second phase; during the first phase, application of the first electrical signal causes the second plate to deform thereby decreasing a distance between the first plate and the second plate from the first distance to a second distance; and during second phase, application of the second electrical signal causes the second plate to return to a starting position prior to the first electrical signal being applied such that the distance between the first plate and the second plate is the first distance.

A8. The system of any one of embodiments A1-A7, wherein the one or more optical elements comprise parallel plates, the system further comprising: a driving circuit configured to: generate the varying input signal; and provide the varying input signal to the one or more optical elements to cause the change to the optical characteristic of the one or more optical elements, wherein the optical characteristic comprises a distance between the parallel plates.

A9. The system of embodiment A8, wherein the varying input signal comprises one of a time-dependent voltage, a time-dependent current, or a time-dependent charge.

A10. The system of embodiment A8, wherein the distance between the parallel plates is between 500 Angstroms and 1 micron.

A11. The system of embodiment A1-A10, wherein the one or more optical elements are disposed on a single chip that forms a micro-electromechanical (MEMS) device.

A12. The system of embodiment A11, wherein: a width of the chip is less than or equal to 10 millimeters (mm); a length of the chip is less than or equal to 10 mm; and a height of the chip is less than or equal to 5 mm.

A13. The system of embodiment A11, wherein: the one or more optical elements comprise a Fabry-Perot interferometer including a first plate and a second plate; one or more conductive elements are coupled to each of the first plate and the second plate; and the one or more conductive elements are configured to at least one of: provide a trigger signal to the capacitance detector and the photo-detector to cause the capacitance detector and the photo-detector to measure an instantaneous mutual capacitance across the first plate and the second plate; provide the varying input signal to at least one of the first plate or the second plate to cause a modulation of the first plate, the second plate, or the first plate and the second plate; and provide data to the capacitance detector representing the instantaneous mutual capacitance, wherein the plurality of capacity values are generated based on the data.

A14. The system of embodiment A13, wherein the one or more conductive elements are located exterior to the first plate and the second plate such that, during application of the varying input signal, a force causes the gap separating the first plate and the second plate to vary.

A15. The system of any one of embodiments A1-A14, wherein the one or more processors are further configured to: generate a trigger signal operable to simultaneously trigger (i) the photo-detector to detect the intensity of the light output from the one or more optical elements and (ii) the capacitance detector to detect the capacitance of the one or more optical elements; and send the trigger signal to the photo-detector and the capacitance detector at a frequency of 10,000 Hz or greater.

A16. The system of any one of embodiments A1-A15, wherein the one or more optical elements comprise: a first plate and a second plate disposed parallel to the first plate such that a gap between the first plate and the second plate is formed; a liquid crystal material is deposited in the gap between the first plate and the second plate; the optical characteristic comprises a dielectric constant of the liquid crystal material; and a value of the dielectric constant is proportional to a value of the varying input signal.

A17. The system of embodiment A16, wherein the one or more processors are further configured to: generate a plurality of dielectric values respectively based on the plurality of capacitance values, wherein the plurality of transformation values comprise a plurality of dielectric values of the liquid crystal material.

A18. The system of any one of embodiments A1-A17, wherein the one or more optical elements are integrated into an image capture device for determining the spectrum of the incoming light incident on the pixel array, on a pixel-by-pixel basis.

B1. A method for operating on incoming light, the method being implemented by one or more processors executing computer program instructions, the method comprising: obtaining, from a capacitance detector configured to detect a capacitance associated with an optical characteristic of one or more optical elements during application of a varying input signal, a plurality of capacitance values representing the capacitance of the one or more optical elements, wherein upon application of the varying input signal, the one or more optical elements cause a change to the optical characteristic thereby resulting in a changing interference pattern produced by incoming light incident on the one or more optical elements; obtaining, from a photo-detector configured to detect an intensity of light output from the one or more optical elements during application of the varying input signal, a plurality of signal values representing the intensity of the light output from the one or more optical elements; and generating a plurality of transformation values respectively based on the plurality of capacitance values, wherein the plurality of transformation values and the plurality of signal values are used to determine a spectrum of the incoming light.

B2. The method of embodiment B1, wherein the one or more optical elements comprise: a first plate and a second plate disposed parallel to the first plate such that a gap between the first plate and the second plate is formed, wherein the optical characteristic comprises a size of the gap which changes as a result of the application of the varying input signal.

B3. The method of embodiment B2, further comprising: allowing selection of a wavelength of the incoming light for detection; and determining a presence of the wavelength of the incoming light using some of the plurality of transformation values and some of the plurality of signal values.

B4. The method of embodiment B2, further comprising: allowing selection of a plurality of wavelengths of the incoming light for detection; and determining a presence of the plurality of wavelengths of the incoming light at the plurality of wavelengths using some of the plurality of transformation values and some of the plurality of signal values.

B5. The method of embodiment A2, wherein: a metallic film or dielectric material is disposed on an inner surface of each of the first plate and the second plate; and each of the first plate and the second plate are formed of glass.

B6. The method of embodiment B2, wherein: the first plate is a first conductive plate formed of a conductive transparent material; the second plate is a second conductive plate formed of the conductive transparent material; and multilayer thin films forming a reflective surface are disposed on an inner surface of each of the first conductive plate and the second conductive plate.

B7. The method of embodiment A2, wherein: the first plate is affixed to a substrate and the second plate is suspended above the first plate at a first distance; the varying input signal comprises a first electrical signal applied to the one or more optical elements during a first phase and a second electrical signal applied to the one or more optical elements during a second phase; during the first phase, application of the first electrical signal causes the second plate to deform thereby decreasing a distance between the first plate and the second plate from the first distance to a second distance; and during second phase, application of the second electrical signal causes the second plate to return to a starting position prior to the first electrical signal being applied such that the distance between the first plate and the second plate is the first distance.

B8. The method of any one of embodiments B1-B7, wherein the one or more optical elements comprise parallel plates, further comprising: generating, via driving circuit, the varying input signal; and providing the varying input signal to the one or more optical elements to cause the change to the optical characteristic of the one or more optical elements, wherein the optical characteristic comprises a distance between the parallel plates.

B9. The method of embodiment B8, wherein the varying input signal comprises one of a time-dependent voltage, a time-dependent current, or a time-dependent charge.

B10. The method of embodiment B8, wherein the distance between the parallel plates is between 500 Angstroms and 1 micron.

B11. The method of embodiment B1-B10, wherein the one or more optical elements are disposed on a single chip that forms a micro-electromechanical (MEMS) device.

B12. The method of embodiment B11, wherein: a width of the chip is less than or equal to 10 millimeters (mm); a length of the chip is less than or equal to 10 mm; and a height of the chip is less than or equal to 5 mm.

B13. The method of embodiment B11, wherein: the one or more optical elements comprise a Fabry-Perot interferometer including a first plate and a second plate; one or more conductive elements are coupled to each of the first plate and the second plate; and the one or more conductive elements are configured to at least one of: provide a trigger signal to the capacitance detector and the photo-detector to cause the capacitance detector and the photo-detector to measure an instantaneous mutual capacitance across the first plate and the second plate; provide the varying input signal to at least one of the first plate or the second plate to cause a modulation of the first plate, the second plate, or the first plate and the second plate; and provide data to the capacitance detector representing the instantaneous mutual capacitance, wherein the plurality of capacity values are generated based on the data.

B14. The method of embodiment B13, wherein the one or more conductive elements are located exterior to the first plate and the second plate such that, during application of the varying input signal, a force causes the gap separating the first plate and the second plate to vary.

B15. The method of any one of embodiments B1-B14, further comprising: generating a trigger signal operable to simultaneously trigger (i) the photo-detector to detect the intensity of the light output from the one or more optical elements and (ii) the capacitance detector to detect the capacitance of the one or more optical elements; and sending the trigger signal to the photo-detector and the capacitance detector at a frequency of 10,000 Hz or greater.

B16. The method of any one of embodiments B1-B15, wherein the one or more optical elements comprise: a first plate and a second plate disposed parallel to the first plate such that a gap between the first plate and the second plate is formed; a liquid crystal material is deposited in the gap between the first plate and the second plate; the optical characteristic comprises a dielectric constant of the liquid crystal material; and a value of the dielectric constant is proportional to a value of the varying input signal.

B17. The method of embodiment B16, further comprising: generating a plurality of dielectric values respectively based on the plurality of capacitance values, wherein the plurality of transformation values comprise a plurality of dielectric values of the liquid crystal material.

B18. The method of any one of embodiments B1-B17, wherein the one or more optical elements are integrated into an image capture device for determining the spectrum of the incoming light incident on the pixel array, on a pixel-by-pixel basis.

C1. A non-transitory computer-readable medium storing computer program instructions that, when executed by one or more processors, effectuate the method of any one of embodiments B1-B18.

D1. A system for operating on incoming light, the system comprising: one or more optical elements that, upon application of a varying input signal thereto, cause a change to an optical characteristic of the one or more optical elements, thereby resulting in a changing interference pattern produced by the incoming light incident on the one or more optical elements; a photo-detector configured to detect, based on a trigger signal having a first frequency, an intensity of light output from the one or more optical elements during application of the varying input signal; and a capacitance detector configured to detect, based on the trigger signal, a capacitance associated with the optical characteristic during the application of the varying input signal.

D2. The system of embodiment D1, wherein the one or more optical elements comprise: a first plate and a second plate disposed parallel to the first plate such that a gap between the first plate and the second plate is formed, wherein the optical characteristic comprises a size of the gap which changes as a result of the application of the varying input signal.

D3. The system of embodiment D2, further comprising: one or more processors configured to: obtain, from the capacitance detector, a plurality of capacitance values representing the capacitance of the one or more optical elements, obtain, from the photo-detector, a plurality of signal values representing the intensity of the light output from the one or more optical elements, and generate a plurality of transformation values respectively based on the plurality of capacitance values.

D4. The system of embodiment D3, wherein the one or more processors are further configured to: allow selection of a wavelength of the incoming light for detection; and determine a presence of the wavelength of the incoming light using some of the plurality of transformation values and some of the plurality of signal values.

D5. The system of embodiment D3, wherein the one or more processors are further configured to: allow selection of a plurality of wavelengths of the incoming light for detection; and determine a presence of the plurality of wavelengths of the incoming light at the plurality of wavelengths using some of the plurality of transformation values and some of the plurality of signal values.

D6. The system of embodiment D2, wherein: a metallic film or dielectric material is disposed on an inner surface of each of the first plate and the second plate; and each of the first plate and the second plate are formed of glass.

D7. The system of embodiment D2, wherein: the first plate is a first conductive plate formed of a conductive transparent material; the second plate is a second conductive plate formed of the conductive transparent material; and multi-layer thin films forming a reflective surface are disposed on an inner surface of each of the first conductive plate and the second conductive plate.

D8. The system of embodiment D2, wherein: the first plate is affixed to a substrate and the second plate is suspended above the first plate at a first distance; the varying input signal comprises a first electrical signal applied to the one or more optical elements during a first phase and a second electrical signal applied to the one or more optical elements during a second phase; during the first phase, application of the first electrical signal causes the second plate to deform thereby decreasing a distance between the first plate and the second plate from the first distance to a second distance; and during second phase, application of the second electrical signal causes the second plate to return to a starting position prior to the first electrical signal being applied such that the distance between the first plate and the second plate is the first distance.

D9. The system of any one of embodiments D1-D8, wherein the one or more optical elements comprise parallel plates, the system further comprising: a driving circuit configured to: generate the varying input signal; and provide the varying input signal to the one or more optical elements to cause the change to the optical characteristic of the one or more optical elements, wherein the optical characteristic comprises a distance between the parallel plates.

D10. The system of embodiment D9, wherein the varying input signal comprises one of a time-dependent voltage, a time-dependent current, or a time-dependent charge.

D11. The system of embodiment D9, wherein the distance between the parallel plates is between 500 Angstroms and 1 micron.

D12. The system of embodiment D1-D11, wherein the one or more optical elements are disposed on a single chip that forms a micro-electromechanical (MEMS) device.

D13. The system of embodiment D12, wherein: a width of the chip is less than or equal to 10 millimeters (mm); a length of the chip is less than or equal to 10 mm; and a height of the chip is less than or equal to 5 mm.

D14. The system of embodiment D12, wherein: the one or more optical elements comprise a Fabry-Perot interferometer including a first plate and a second plate; one or more conductive elements are coupled to each of the first plate and the second plate; and the one or more conductive elements are configured to at least one of: provide a trigger signal to the capacitance detector and the photo-detector to cause the capacitance detector and the photo-detector to measure an instantaneous mutual capacitance across the first plate and the second plate; provide the varying input signal to at least one of the first plate or the second plate to cause a modulation of the first plate, the second plate, or the first plate and the second plate; and provide data to the capacitance detector representing the instantaneous mutual capacitance, wherein the plurality of capacity values are generated based on the data.

D15. The system of embodiment D14, wherein the one or more conductive elements are located exterior to the first plate and the second plate such that, during application of the varying input signal, a force causes the gap separating the first plate and the second plate to vary.

D16. The system of any one of embodiments D3-D15, wherein the one or more processors are further configured to: generate a trigger signal operable to simultaneously trigger (i) the photo-detector to detect the intensity of the light output from the one or more optical elements and (ii) the capacitance detector to detect the capacitance of the one or more optical elements; and send the trigger signal to the photo-detector and the capacitance detector at a frequency of 10,000 Hz or greater.

D17. The system of any one of embodiments D1-D16, wherein the one or more optical elements comprise: a first plate and a second plate disposed parallel to the first plate such that a gap between the first plate and the second plate is formed; a liquid crystal material is deposited in the gap between the first plate and the second plate; the optical characteristic comprises a dielectric constant of the liquid crystal material; and a value of the dielectric constant is proportional to a value of the varying input signal.

D18. The system of embodiment D17, further comprising: one or more processors configured to: obtain, from the capacitance detector, a plurality of capacitance values representing the capacitance of the one or more optical elements, obtain, from the photo-detector, a plurality of signal values representing the intensity of the light output from the one or more optical elements, generate a plurality of transformation values respectively based on the plurality of capacitance values; generate a plurality of dielectric values respectively based on a plurality of capacitance values, wherein the plurality of transformation values comprise a plurality of dielectric values of the liquid crystal material.

D19. The system of any one of embodiments D1-D18, wherein the one or more optical elements are integrated into an image capture device for determining the spectrum of the incoming light incident on the pixel array, on a pixel-by-pixel basis.

D20. The system of any one of embodiments D1-D19, wherein the one or more optical elements are integrated into an image capture device, such as a camera, for determining the spectrum of the incoming light incident on the pixel array, on a pixel-by-pixel basis.

D21. The system of any one of embodiments D1-D19, further comprising: a current detector configured to measure a current drawn by the one or more optical elements during the application of the varying input signal, wherein the current is used to determine the capacitance of the one or more optical elements.

E1. A system for operating on incoming light, the system comprising: one or more optical elements that, upon application of a varying input signal thereto, cause a change to an optical characteristic of the one or more optical elements, thereby resulting in a changing interference pattern produced by the incoming light incident on the one or more optical elements; a photo-detector configured to detect, based on a trigger signal having a first frequency, an intensity of light output from the one or more optical elements during application of the varying input signal; and a current detector configured to detect, based on the trigger signal, a current drawn by the one or more optical elements during the application of the varying input signal.

E2. The system of embodiment A1, wherein the one or more optical elements comprise: a first plate and a second plate disposed parallel to the first plate such that a gap between the first plate and the second plate is formed, wherein the optical characteristic comprises a size of the gap which changes as a result of the application of the varying input signal.

E3. The system of embodiment E2, wherein the one or more processors are further configured to: allow selection of a wavelength of the incoming light for detection; and determine a presence of the wavelength of the incoming light using some of the plurality of transformation values and some of the plurality of signal values.

E4. The system of embodiment E2, wherein the one or more processors are further configured to: allow selection of a plurality of wavelengths of the incoming light for detection; and determine a presence of the plurality of wavelengths of the incoming light at the plurality of wavelengths using some of the plurality of transformation values and some of the plurality of signal values.

E5. The system of embodiment E2, wherein: a metallic film or dielectric material is disposed on an inner surface of each of the first plate and the second plate; and each of the first plate and the second plate are formed of glass.

E6. The system of embodiment E2, wherein: the first plate is a first conductive plate formed of a conductive transparent material; the second plate is a second conductive plate formed of the conductive transparent material; and multi-layer thin films forming a reflective surface are disposed on an inner surface of each of the first conductive plate and the second conductive plate.

E7. The system of embodiment E2, wherein: the first plate is affixed to a substrate and the second plate is suspended above the first plate at a first distance; the varying input signal comprises a first electrical signal applied to the one or more optical elements during a first phase and a second electrical signal applied to the one or more optical elements during a second phase; during the first phase, application of the first electrical signal causes the second plate to deform thereby decreasing a distance between the first plate and the second plate from the first distance to a second distance; and during second phase, application of the second electrical signal causes the second plate to return to a starting position prior to the first electrical signal being applied such that the distance between the first plate and the second plate is the first distance.

E8. The system of any one of embodiments E1-E7, wherein the one or more optical elements comprise parallel plates, the system further comprising: a driving circuit configured to: generate the varying input signal; and provide the varying input signal to the one or more optical elements to cause the change to the optical characteristic of the one or more optical elements, wherein the optical characteristic comprises a distance between the parallel plates.

E9. The system of embodiment E8, wherein the varying input signal comprises one of a time-dependent voltage, a time-dependent current, or a time-dependent charge.

E10. The system of embodiment E8, wherein the distance between the parallel plates is between 500 Angstroms and 1 micron.

E11. The system of embodiment E1-E10, wherein the one or more optical elements are disposed on a single chip that forms a micro-electromechanical (MEMS) device.

E12. The system of embodiment E11, wherein: a width of the chip is less than or equal to 10 millimeters (mm); a length of the chip is less than or equal to 10 mm; and a height of the chip is less than or equal to 5 mm.

E13. The system of embodiment E11, wherein: the one or more optical elements comprise a Fabry-Perot interferometer including a first plate and a second plate; one or more conductive elements are coupled to each of the first plate and the second plate; and the one or more conductive elements are configured to at least one of: provide a trigger signal to the current detector and the photo-detector to cause the current detector and the photo-detector to measure current drawn by the optical element; provide the varying input signal to at least one of the first plate or the second plate to cause a modulation of the first plate, the second plate, or the first plate and the second plate; and provide data to the current detector.

E14. The system of embodiment E13, wherein the one or more conductive elements are located exterior to the first plate and the second plate such that, during application of the varying input signal, a force causes the gap separating the first plate and the second plate to vary.

E15. The system of any one of embodiments E1-E14, wherein the one or more processors are further configured to: generate a trigger signal operable to simultaneously trigger (i) the photo-detector to detect the intensity of the light output from the one or more optical elements and (ii) the current detector to detect the current drawn by the one or more optical elements; and send the trigger signal to the photo-detector and the current detector at a frequency of 10,000 Hz or greater.

E16. The system of any one of embodiments E1-E15, wherein the one or more optical elements comprise: a first plate and a second plate disposed parallel to the first plate such that a gap between the first plate and the second plate is formed; a liquid crystal material is deposited in the gap between the first plate and the second plate; the optical characteristic comprises a dielectric constant of the liquid crystal material; and a value of the dielectric constant is proportional to a value of the varying input signal.

E16. The system of any one of embodiments E1-E15, wherein the one or more optical elements comprise: a first plate and a second plate disposed parallel to the first plate such that a gap between the first plate and the second plate is formed; a liquid crystal material is deposited in the gap between the first plate and the second plate; the optical characteristic comprises a dielectric constant of the liquid crystal material; and a value of the dielectric constant is proportional to a value of the varying input signal.

E17. The system of embodiment E16, further comprising: one or more processors configured to: obtain, from the current detector, a plurality of current values indicating a current drawn by the one or more optical elements; generate a plurality of values based on the plurality of current values, the plurality of capacitance values representing the capacitance of the one or more optical elements; and generate a plurality of dielectric values respectively based on the plurality of capacitance values.

E18. The system of any one of embodiments E1-E17, wherein the one or more optical elements comprise: a first plate and a second plate separated by a gap, wherein the optical characteristic of the one or more optical elements comprises a size of the gap; and one or more conductive elements configured to cause, based on the varying input signal, the size of the gap separating the first plate and the second plate to vary.

E19. The system of embodiment E18, wherein the one or more conductive elements are located exterior to the first plate and the second plate such that, during application of the varying input signal, a force causes the gap separating the first plate and the second plate to vary.

E20. The system of any one of embodiments E1-E19, wherein the one or more optical elements are integrated into an image capture device, such as a camera, for determining the spectrum of the incoming light incident on the pixel array, on a pixel-by-pixel basis.

What is claimed is:

1. A micro electro-mechanical (MEMS) apparatus for operating upon electromagnetic radiation incident thereon, to create an altered electromagnetic radiation beam upon transmission therethrough, the apparatus receiving varying electrical input signals and at least one measurement input signal, and comprising:
   a Fabry-Perot etalon that includes a pair of multi-layer partially reflective, partially transmissive plates disposed parallel to one another and spaced with a first gap distance that includes an air-gap, wherein the first gap distance has a first predetermined distance in an initial plate position;
   a pair of electrodes, each of the pair of electrodes being mechanically coupled to one of the multi-layer partially reflective, partially transmissible plates, wherein the pair of electrodes are disposed parallel to one another and spaced with a second gap distance, wherein the second gap distance has a second predetermined distance in an initial electrode position;
   wherein each of the pair of electrodes are ring-shaped electrodes, and the electromagnetic radiation incident on the Fabry-Perot etalon strikes the Fabry-Perot etalon at an area interior to the ring-shaped electrodes;
   where each of the pair of ring-shaped electrodes is comprised of three independent components;
   wherein the second predetermined distance is greater than the first predetermined distance by an amount that is at least one applied layer of one of the pair of multi-layer partially reflective, partially transmissive plates;
   wherein upon application of one of the varying electrical input signals to each of the three independent components of the pair of electrodes of the MEMS apparatus, a varying first gap distance results between the pair of multi-layer partially reflective, partially transmissive plates of the Fabry-Perot etalon that is smaller than a varying second gap distance between the pair of electrodes, thereby causing the electromagnetic radiation incident on the Fabry-Perot etalon to change characteristics upon passing through the pair of multi-layer partially reflective, partially transmissive plates and result in the altered electromagnetic radiation beam; and wherein a measurement signal is obtained from the MEMS apparatus across the pair of electrodes or across the pair of multi-layer partially reflective, partially transmissive plates or a pair comprising one of the pair of electrodes and one of the pair of multi-layer partially reflective, partially transmissive plates.

2. The apparatus according to claim 1, wherein the at least one applied layer is non-conductive and that is mechanically coupled to a top one of the pair of electrodes.

3. The apparatus according to claim 2, wherein the measurement signal is taken across the pair of electrodes.

4. The apparatus according to claim 2, wherein the at least one applied layer is within a top one of the pair of multi-layer partially reflective, partially transmissive plates, and each of the pair of multi-layer partially reflective, partially transmissive plates has an inner layer that is a conductive transparent material.

5. The apparatus according to claim 4, wherein the measurement signal is taken across the inner layer of each of the pair of multi-layer partially reflective, partially transmissive plates.

6. The apparatus according to claim 4, wherein the apparatus is made on a chip, and
a width of the chip is less than or equal to 10 millimeters (mm);
a length of the chip is less than or equal to 10 mm; and
a height of the chip is less than or equal to 5 mm.

7. The apparatus according to claim 4, wherein the first predetermined distance is in the range of 5,000-10,000 Angstroms.

8. The apparatus according to claim 4, wherein the MEMS apparatus operates in at least one of the visible spectrum, the infrared spectrum and the ultraviolet spectrum.

9. The apparatus according to claim 4, wherein the MEMS apparatus operates in the visible spectrum, the infrared spectrum and the ultraviolet spectrum.

10. The apparatus of claim 2, wherein:
each of the pair of multi-layer partially reflective, partially transmissive plates include:
glass, which glass for one of the pair of multi-layer partially reflective, partially transmissive plates is the at least one applied layer that is nonconductive; and
a conducting film or dielectric film disposed on an inner surface of each of the glass, thereby providing for the partially transmissive and the partially reflective aspects of each of the pair of multi-layer partially reflective, partially transmissive plates.

11. The apparatus of claim 10, wherein the conducting film is disposed on the inner surface of each of the glass.

12. The apparatus of claim 11, wherein the pair of multi-layer partially reflective, partially transmissive plates are identified as a first plate and a second plate, wherein the first plate is affixed to a substrate and the second plate is disposed above the first plate at the first predetermined distance;
the varying input signal comprises a first electrical voltage signal applied to the pair of electrodes, wherein application of the first electrical voltage signal causes the second plate to deform from the initial plate position, thereby decreasing the first gap from the first predetermined distance to a second distance; and
wherein measurement signal is obtained as one or more of a capacitance, a voltage, or a current.

13. The apparatus of claim 12, wherein the first predetermined distance is between 500 Angstroms and 1 micron.

14. The apparatus of claim 11, wherein upon application of the varying electrical input signal to the pair of electrodes of the MEMS apparatus, the varying first gap distance results between the pair of multi-layer partially reflective, partially transmissive plates of the Fabry-Perot etalon as a result of a deflection of the first plate, deflection of the second plate, or deflection of the first plate and the second plate; and the Fabry-Perot etalon functions as a parallel plate capacitor that provides an instantaneous mutual capacitance.

15. The apparatus of claim 10, wherein the each of the pair of electrodes are disposed on a surface of each of the glass associated with each of the pair of multi-layer partially reflective, partially transmissive plates, respectively.

* * * * *